US007664055B2

(12) United States Patent
Nelson

(10) Patent No.: US 7,664,055 B2
(45) Date of Patent: Feb. 16, 2010

(54) SYSTEM AND METHOD FOR SYNCHRONIZING COMPONENTS IN A MESH NETWORK

(75) Inventor: Dan R. Nelson, Sligo (IE)

(73) Assignee: RF Monolithics, Inc., Dallas, TX (US)

( * ) Notice: Subject to any disclaimer, the term of this patent is extended or adjusted under 35 U.S.C. 154(b) by 824 days.

(21) Appl. No.: 11/084,991

(22) Filed: Mar. 21, 2005

(65) Prior Publication Data

US 2006/0209878 A1 Sep. 21, 2006

(51) Int. Cl.
*H04L 12/28* (2006.01)
*H04L 12/43* (2006.01)
*H04J 3/06* (2006.01)
*H04J 3/26* (2006.01)
*H04J 3/02* (2006.01)
*H04B 7/212* (2006.01)

(52) U.S. Cl. .................. 370/256; 370/432; 370/442; 370/458; 370/461; 370/462; 370/503

(58) Field of Classification Search ................. 370/351, 370/376, 458, 459, 460, 503–520
See application file for complete search history.

(56) References Cited

U.S. PATENT DOCUMENTS

| | | | | |
|---|---|---|---|---|
| 5,090,013 | A * | 2/1992 | Fadem | .......................... 370/449 |
| 5,412,654 | A | 5/1995 | Perkins | |
| 5,612,948 | A | 3/1997 | Fette et al. | |
| 6,307,843 | B1 | 10/2001 | Okanoue | |
| 6,535,498 | B1 | 3/2003 | Larsson et al. | |
| 6,668,157 | B1 | 12/2003 | Takeda et al. | |
| 6,680,920 | B1 * | 1/2004 | Wan | .......................... 370/311 |
| 6,704,293 | B1 | 3/2004 | Larsson et al. | |
| 6,980,537 | B1 | 12/2005 | Liu | |
| 7,009,994 | B2 * | 3/2006 | Bahl | .......................... 370/458 |
| 7,406,054 | B2 | 7/2008 | Seo et al. | |
| 2002/0039357 | A1 | 4/2002 | Lipasti et al. | |
| 2002/0167898 | A1 | 11/2002 | Thang et al. | |
| 2003/0212821 | A1 | 11/2003 | Gillies et al. | |
| 2004/0174829 | A1 * | 9/2004 | Ayyagari | ..................... 370/254 |
| 2004/0223466 | A1 * | 11/2004 | Schrader et al. | ............. 370/321 |
| 2005/0030968 | A1 * | 2/2005 | Rich et al. | .................. 370/449 |
| 2005/0201340 | A1 * | 9/2005 | Wang et al. | ................. 370/337 |
| 2006/0209878 | A1 | 9/2006 | Nelson | |
| 2008/0002599 | A1 | 1/2008 | Yau et al. | |

OTHER PUBLICATIONS

Ireland Patent Application No. 970877, inventor Dan R. Nelson, entitled "A System Which Routes Radio Transmissions Using Intermediate Radio Repeater Devices".
S. Rao et al., "Detecting Inactive Neighbors over OSPF Demand Circuits", Network Working Group, RFC 3883, Oct. 2004, 2 pages.

* cited by examiner

*Primary Examiner*—Seema S Rao
*Assistant Examiner*—Christine Duong

(57) ABSTRACT

A method includes receiving a first message at a router in a mesh network and synchronizing the router to a plurality of time slots using the first message. The method also includes repeatedly incrementing a network reference value at each time slot up to a maximum value and then decrementing the network reference value at each time slot down to a minimum value. In addition, the method includes broadcasting a second message at the router when the network reference value has a specific value that is associated with a unique identifier of the router.

20 Claims, 15 Drawing Sheets

SYSTEM AND METHOD FOR SYNCHRONIZING COMPONENTS IN A MESH NETWORK

CROSS REFERENCE TO RELATED APPLICATIONS

This application is related to U.S. patent Ser. No. 11/085,427 entitled "System and Method for Collecting Routing Information in a Mesh Network", filed on Mar. 21, 2005; which is hereby incorporated by reference.

TECHNICAL FIELD

This disclosure is generally directed to communication systems. More specifically, this disclosure is directed to a system and method for synchronizing components in a mesh network.

BACKGROUND

Data communication systems have been used for many years. Conventional communication systems typically include wired or wireless end-user devices that communicate with a central controller, which controls various operations in the conventional systems. Information is typically routed between the central controller and the end-user devices using components such as routers or repeaters.

The timing of communications in the conventional communication systems is often important for ensuring proper operation of the communication systems. For example, precise timing is often needed to ensure that multiple components in the communication systems do not attempt to transmit on the same frequency at the same time.

SUMMARY

This disclosure provides a system and method for synchronizing components in a mesh network.

In one aspect, a method includes receiving a first message at a router in a mesh network and synchronizing the router to a plurality of time slots using the first message. The method also includes repeatedly incrementing a network reference value at each time slot up to a maximum value and then decrementing the network reference value at each time slot down to a minimum value. In addition, the method includes broadcasting a second message at the router when the network reference value has a specific value that is associated with a unique identifier of the router.

In a second aspect, a computer program is embodied on a computer readable medium and is operable to be executed. The computer program includes computer readable program code for performing the steps of the method.

In a third aspect, a mesh network includes a plurality of routers capable of communicating with a plurality of user endpoints and a central controller capable of defining a plurality time slots and communicating with at least one of the routers in at least one of the time slots. Each router is further capable of receiving a first message in one of the time slots and synchronizing the router to the plurality of time slots using the first message. Each router is also capable of repeatedly incrementing a network reference value at each time slot up to a maximum value and then decrementing the network reference value at each time slot down to a minimum value. In addition, each router is capable of broadcasting a second message at the router when the network reference value has a specific value that is associated with a unique identifier of the router.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
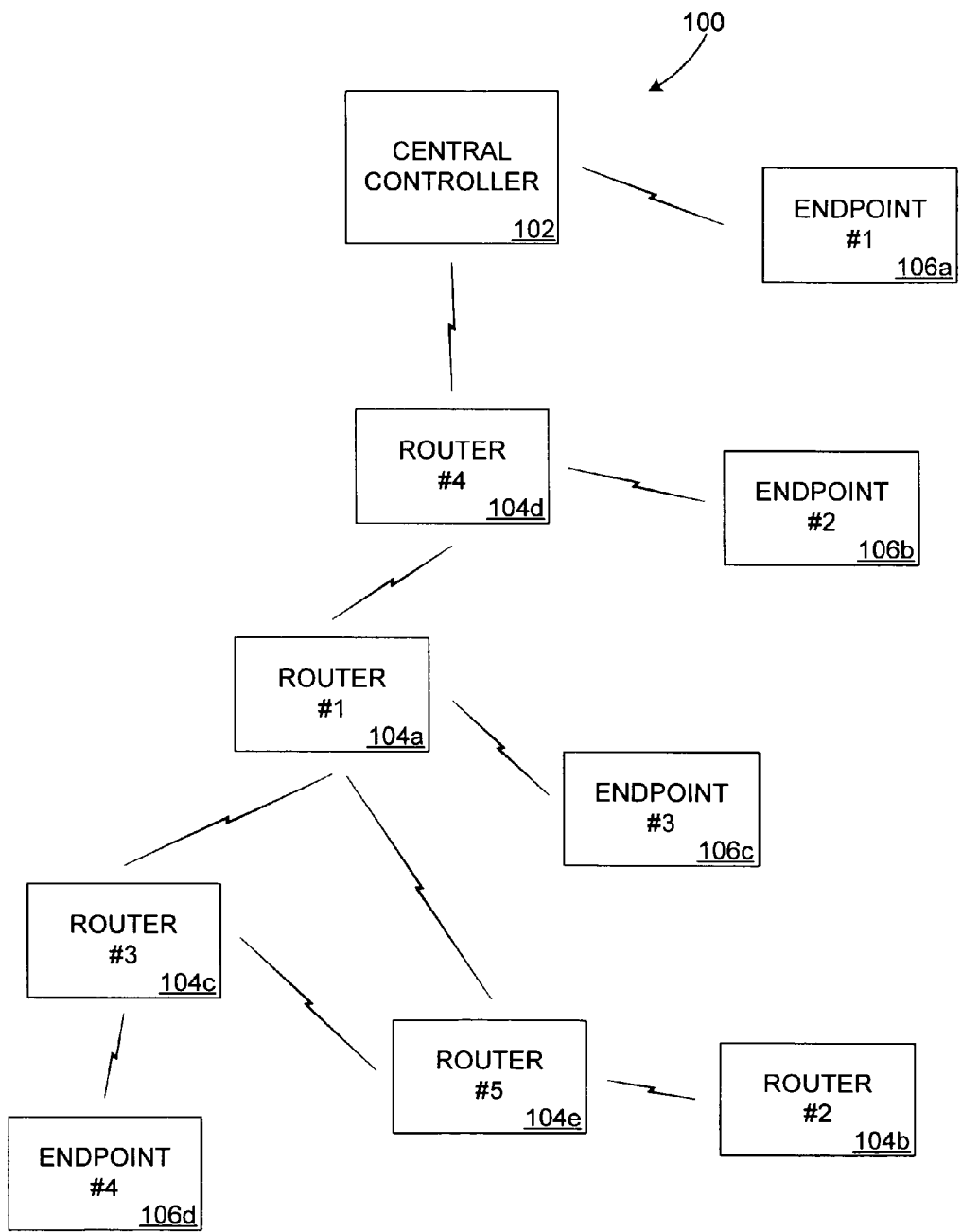
FIG. 1 illustrates an example mesh network according to one embodiment of this disclosure.

FIG. 1 illustrates an example mesh network 100 according to one embodiment of this disclosure. The embodiment of the mesh network 100 shown in FIG. 1 is for illustration only. Other embodiments of the mesh network 100 may be used without departing from the scope of this disclosure.

In the illustrated example, the mesh network 100 includes a central controller 102, multiple routers 104a-104e, and multiple user endpoints 106a-106d. The central controller 102 communicates with the user endpoints 106a-106d directly or through the routers 104a-104e. The central controller 102 also performs any of a wide variety of additional functions in the mesh network 100. For example, the central controller 102 could provide remote access to a database, and the central controller 102 may store data from the user endpoints 106a-106d and retrieve data for the user endpoints 106a-106d.

The central controller 102 includes any hardware, software, firmware, or combination thereof for collecting and using routing information about the mesh network 100. As a particular example, the central controller 102 may include one or more processors and one or more memories capable of storing instructions executed by the processors and data used by the processors. The central controller 102 may also include a radio frequency antenna and transceiver capable of communicating with the routers 104a-104e and/or the user endpoints 106a-106d using radio frequency signals.

The routers 104a-104e communicate and transport information between the central controller 102 and the user endpoints 106a-106d. For example, the routers 104a-104e may receive information from the central controller 102 and transmit the information to the user endpoints 106a-106d or to other routers 104a-104e for transmission to the user endpoints 106a-106d. The routers 104a-104e may also receive information from the user endpoints 106a-106d and transmit the information to the central controller 102 or to other routers 104a-104e for transmission to the central controller 102. Each router is typically capable of establishing a communication link with all of the other routers, but the layout of the mesh network 100 usually prevents this from occurring. As a result, each router typically establishes a communication link with some of the other routers. In some embodiments, each of the routers 104a-104e represents a mobile device or a fixed device. In particular embodiments, the mesh network 100 includes some fixed routers and some mobile routers, although other embodiments of the mesh network 100 may be used.

Each of the routers 104a-104e represents any hardware, software, firmware, or combination thereof for routing information through the mesh network 100. As an example, the routers 104a-104e could represent routing devices that receive data and transmit the data to a particular destination, such as another router or a user endpoint. The routers 104a-104e could also represent repeater devices that receive data and transmit the data without identifying a particular destination for the data. As a particular example, each of the routers 104a-104e may include one or more processors and one or more memories capable of storing instructions executed by the processors and data used by the processors. Each of the routers 104a-104e may also include a radio frequency antenna and transceiver capable of communicating with the central controller 102 and the user endpoints 106a-106d using radio frequency signals.

The user endpoints 106a-106d communicate with the central controller 102 directly or through the routers 104a-104e. The user endpoints 106a-106d also perform any of a wide variety of additional functions in the mesh network 100. For example, the user endpoints 106a-106d could represent mobile devices that allow users to access a database of information that is maintained by the central controller 102. In some embodiments, each of the user endpoints 106a-106d represents a mobile device or a fixed device. In particular embodiments, the mesh network 100 includes some fixed user endpoints and some mobile user endpoints, although other embodiments of the mesh network 100 may be used.

The user endpoints 106a-106d may communicate data to the routers 104a-104e in any suitable manner. For example, the user endpoints 106a-106d could repeatedly transmit the same data to the routers 104a-104e. The user endpoints 106a-106d could also respond to queries received over the routers 104a-104e. The user endpoints 106a-106d could communicate in any other suitable manner.

Each of the user endpoints 106a-106d includes any hardware, software, firmware, or combination thereof for transmitting information to and/or receiving information from the central controller 102. As examples, the user endpoints 106a-106d could represent devices such as mobile computing devices such as handheld personal digital assistants, mobile communication devices such as mobile telephones, and fixed communication or computing devices. As a particular example, each of the user endpoints 106a-106d may include one or more processors and one or more memories capable of storing instructions executed by the processors and data used by the processors. Each of the user endpoints 106a-106d may also include a radio frequency antenna and transceiver capable of communicating with the routers 104a-104e using radio frequency signals.

The various components in the mesh network 100 may communicate using any suitable wireless connections. For example, the components may communicate using radio frequency signals. In some embodiments, all components in the mesh network 100 communicate using the same radio frequency. In other embodiments, all components in the mesh network 100 may communicate using a primary radio frequency and, when interference is detected, communicate using a secondary radio frequency.

In one aspect of operation, the central controller 102 collects routing information about the mesh network 100 during a "link discovery" process. For example, the central controller 102 may receive information from the routers 104a-104e identifying communication links between the routers 104a-104e. This information identifies the "visibility" of each router to other routers in the mesh network 100. The routing information may routinely change, for example, when at least some of the routers 104a-104e are mobile. The central controller 102 then uses the routing information to determine how to route information to the user endpoints 106a-106d through the routers 104a-104e.

In some embodiments, the central controller 102 collects routing information by communicating a link request message to any routers in direct communication with the central controller 102 (in this case, router 104d). Each of the routers 104a-104e in the mesh network 100 eventually receives the link request message. Each router then identifies the other routers that are in direct communication with that router. For example, router 104d may determine that it is only receiving a signal from router 104a, while router 104a may determine that it is receiving a signal from routers 104c-104e.

Each of the routers 104a-104e then provides this information to the central controller 102 in a link response message. The link response message contains information identifying the routers that a particular router can detect. For example, a link response message may include a link list, which contains an entry for each of the routers 104a-104e in the mesh network 100. Each entry identifies the routers that are in communication with a specified router in the mesh network 100. As a specific example, the first entry in the link list could identify the routers detected by router 104a, the second entry in the link list could identify the routers detected by router 104b, and so on.

In particular embodiments, each router that receives a link response message consolidates the information from its link list with the link list contained in the link response message. This allows a single link list to contain routing information from multiple routers. In fact, in this example, the central controller 102 would receive only one link response message containing a single link list from the router 104d. The single link list would contain information identifying all of the communication links between the routers 104a-104e in the mesh network 100. However, in other embodiments, the central controller 102 could receive multiple link response messages containing multiple link lists, depending on the layout of the mesh network 100. As an example, if the central controller 102 is in direct communication with two different routers, the central controller 102 could receive a link response message from both of the routers.

After the link discovery process, each of the routers 104a-104e routes information in the mesh network 100, such as information between the central controller 102 and the user endpoints 106a-106d. One or more of the routers 104a-104e may determine that a new router is visible that was not previously visible during the link discovery process. When a first router detects visibility with a new second router, the first router sets a link discovery update flag. When the first router receives a message destined for the central controller 102, the first router embeds in the message an indication that its link discovery update flag has been set. The message is then broadcast for direct or indirect delivery to the central controller 102. The first router may repeat this process for every message received that is destined for the central controller 102. The central controller 102 may maintain a list of which routers 104a-104e have set their link discovery update flag and, based on those flags, determine when to repeat the link discovery process. For example, the central controller 102 may repeat the link discovery process after one-quarter or one-half of the routers 104a-104e have set their link discovery update flag. When the link discovery process is performed, the routers 104a-104e may reset their link discovery update flag.

In another aspect of operation, the central controller 102 collects information about the user endpoints 106a-106d in the mesh network 100 during a "border discovery" process. For example, the central controller 102 may receive information from the routers 104a-104e identifying which user endpoints 106a-106d are in direct communication with each of the routers 104a-104e. This information may routinely change, for example, when at least some of the routers 104a-104e and/or at least some of the user endpoints 106a-106d are mobile. The central controller 102 then uses this information to determine how to route information to the user endpoints 106a-106d.

In some embodiments, the process of border discovery occurs and is integrated into the normal routing of messages between the central controller 102 and the user endpoints 106a-106d. For example, one of the routers 104a-104e may receive a message directly from one of the user endpoints 106a-106d (as opposed to indirectly though another of the routers 104a-104e). The router directly receiving the message from the user endpoint embeds its own unique identifier or other identifier into the message. The router also embeds into the message an indication that the user endpoint is newly visible to the router. The message is then transmitted directly or indirectly to the central controller 102. The central controller 102 receives the message and extracts the identifier associated with the router.

In this way, the central controller 102 may identify the user endpoints 106a-106d in the network 100. Also, the central controller 102 may identify the routers that are in direct communication with those user endpoints 106a-106d. The central controller 102 may use this information in any suitable manner. For example, to transmit a message to a particular one of the user endpoints 106a-106d, the central controller 102 may use the identity of the router in direct communication with that endpoint and the information collected during the link discovery process to determine how to efficiently route the message to the user endpoint. In addition, the central controller 102 may be able to continuously update and monitor the positions of the user endpoints 106a-106d in the mesh network 100.

Depending on the arrangement of the network 100, one of the user endpoints 106a-106d may be directly visible to two or more of the routers 104a-104e. As a result, when the endpoint transmits a message, multiple routers may receive and embed their unique identifiers into different copies of the message and attempt to route the copies of the message to the central controller 102. However, because of the routing process used by the routers 104a-104e, only one copy of the message (containing only one router identifier) may be received by the central controller 102. For example, a router that receives the different copies of the message may recognize that the copies relate to the same message and forward only the earliest-received copy. Other techniques could also be used, such as when all copies of the message are received by the central controller 102 and the central controller 102 records one, some, or all of the router identifiers associated with the user endpoint.

In a third aspect of operation, the central controller 102, the routers 104a-104e, and the user endpoints 106a-106d in the mesh network 100 may communicate using signals that interfere with each other. If two or more components in the mesh network 100 attempt to transmit information in an overlapping manner, a collision may occur, and data from both components may be lost. To help avoid collisions, the components in the mesh network 100 implement a timing scheme to synchronize the components. Synchronized timing allows the components in the mesh network to use a received message to accurately identify time slots in which the components may communicate without overlapping.

In some embodiments, the components in direct communication with the central controller 102 are synchronized with the central controller 102. Additional components in the mesh network 100 are synchronized when those components communicate with the components in direct communication with the central controller 102. As a particular example, the router 104d may be synchronized with the central controller 102 at the beginning of a communication. If router 104d communicates with router 104a, router 104a may synchronize with router 104d. Similarly, if router 104a communicates with router 104c, router 104c may synchronize with router 104a. In this way, synchronization propagates through the mesh network 100, which helps to at least partially reduce collisions in the mesh network 100.

Although FIG. 1 illustrates one example of a mesh network 100, various changes may be made to FIG. 1. For example, the mesh network 100 may include any number of routers 104 and user endpoints 106. Also, the mesh network 100 may have any arrangement of routers 104 and user endpoints 106. Further, while FIG. 1 illustrates the use of wireless communications between the components in the mesh network 100, at least some of the components could communicate using wired connections. In addition, while FIG. 1 has illustrated separate components in the mesh network 100, various components may be combined. As an example, a user endpoint could include a router, and the integrated device may perform both routing and end user functions.

Figure 2:
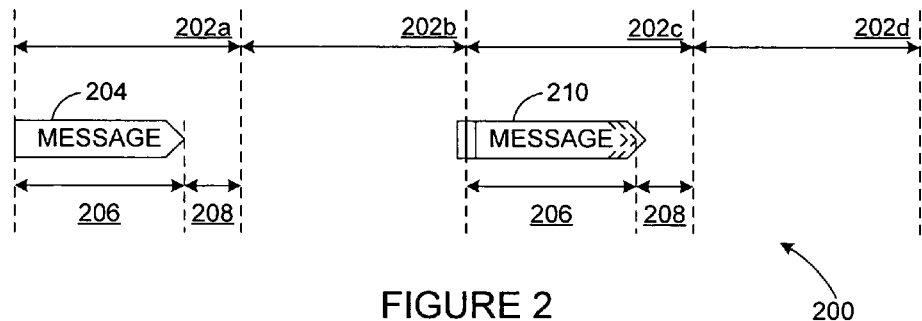
FIG. 2 illustrates an example synchronization technique for preventing collisions in a mesh network according to one embodiment of this disclosure.

FIG. 2 illustrates an example synchronization technique 200 for preventing collisions in a mesh network according to one embodiment of this disclosure. For ease of explanation, the synchronization technique 200 is described with respect to the mesh network 100 of FIG. 1. The synchronization technique 200 could be used by any other networks without departing from the scope of this disclosure. Also, the mesh network 100 could use other synchronization techniques without departing from the scope of this disclosure.

In this example, the synchronization technique 200 divides communications into multiple time slots 202a-202d. Each of the time slots 202a-202d represents a fixed period of time. The synchronization technique 200 starts when a message 204 is transmitted from the central controller 102. The message 204 itself has a fixed length and requires a fixed time to be transmitted, and this fixed time is referred to as a message time 206. Upon receipt of the message 204, a router (router 104d in FIG. 1) adds a fixed length of additional time 208 to the message time 206. The additional time 208 allows the mesh network 100 to take into account the time needed to process messages by the components in the mesh network 100, as well as variances within the routers 104a-104e. The combination of the message time 206 and the additional time 208 defines the length of the time slot 202a. In some embodiments, the fixed length of additional time 208 is known to all routers 104a-104e and remains constant for all messages regardless of the message time 206.

Subsequent time slots 202b-202d may remain synchronized in any number of ways. In some embodiments, the length of the time slot 202a is stored in an internal register of the router 104d. The value in the register is used to set a slot timer in the router 104d, and the end of the next time slot 202b is identified when the slot timer expires. The value in the register is used to reset the slot timer, and the end of the next time slot 202c is identified when the slot timer expire again. This allows the router 104d to identify the remaining time slots 202b-202d.

The router 104d could also use a valid incoming message 210 from a neighboring router (such as router 104a in FIG. 1). The receipt of the message 210 may or may not occur on the expected boundary of a time slot. If not, the router 104d may re-align or re-synchronize its slot timer. For example, the router 104d may wait for the additional time 208 to elapse after receipt of the message 210, and the router 104d may start the slot timer after expiration of the additional time 208.

The other routers in the mesh network 100 are synchronized in a similar manner. For example, router 104a may receive a message from router 104d. The router 104a may use the message time 206 of that message and the additional time 208 to determine the length of a time slot. The router 104a then uses an internal register to store the length of the time slot and a slot timer to time the time slots. The router 104a may then communicate a message to router 104c and/or router 104e, and either of those routers 104c, 104e may use the same technique. In this way, the time slots may be established in a daisy chain manner throughout the mesh network 100, allowing each router to identify the time slots that may be used to transmit information. This procedure also prevents collisions from occurring in the mesh network 100.

Although FIG. 2 illustrates one example of a synchronization technique 200 for preventing collisions in a mesh network, various changes may be made to FIG. 2. For example, other or additional techniques may be used to synchronize or re-synchronize the routers 104a-104e in the mesh network 100.

Figure 3:
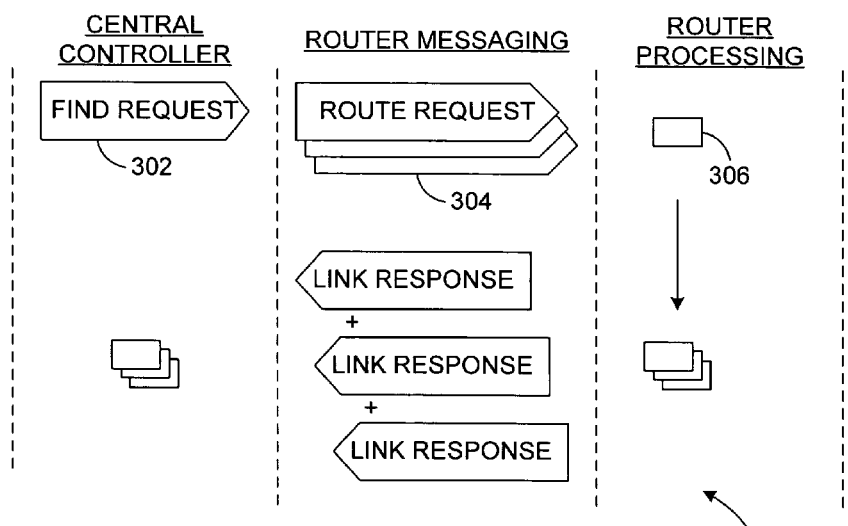
FIG. 3 illustrates an example collection of routing information in a mesh network according to one embodiment of this disclosure.

FIG. 3 illustrates an example collection 300 of routing information in a mesh network according to one embodiment of this disclosure. For ease of explanation, the collection 300 of routing information is described with respect to the mesh network 100 of FIG. 1. The collection 300 of routing information could be performed by any other networks without departing from the scope of this disclosure. Also, the mesh network 100 could use other collection techniques without departing from the scope of this disclosure.

Figure 4:
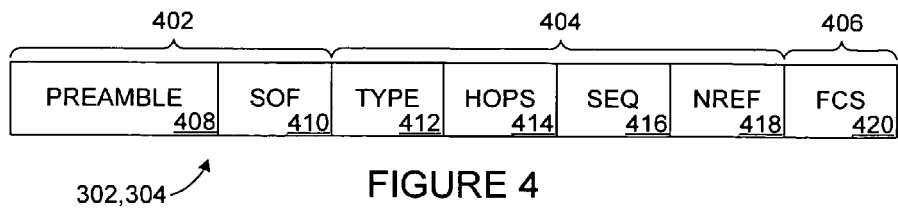
FIG. 4 illustrates an example message for initiating collection of routing information in a mesh network according to one embodiment of this disclosure.

In this example, the collection 300 of routing information in the mesh network 100 begins with a link discovery process. The link discovery process involves the routers 104a-104e identifying all of the communication links that connect the routers. The link discovery process is initiated when the central controller 102 generates and communicates a find link request message 302 to at least one of the routers 104a-104e in the mesh network 100. The find link request message 302 requests that the various routers 104a-104e in the mesh network 100 collect information about visible communication links between the routers and provide this information to the central controller 102. The find link request message 302 may have any suitable contents and format. One example embodiment of the find link request message 302 is shown in FIG. 4, which is described below.

The request for routing information is routed to the routers 104a-104e in the network 100 in the form of route request messages 304. For example, the first router (such as router 104d in FIG. 1) to receive the find link request message 302 from the central controller 102 may transmit a route request message 304 to all other routers (such as router 104a in FIG. 1) in contact with that router 104d. The route request messages 304 may have the same content and arrangement as the find link request message 302, or the messages could have different contents and/or formats.

When a router receives a find link request message 302 or a route request message 304, that router generates a link map 306. The link map 306 identifies the communication links that are visible to the router, such as the communication links to other routers. For example, each find link request message 302 and route request message 304 may identify the source of the message (such as central controller 102 or a router). When a router receives one of these messages, the router may insert the identity of the source into the link map 306. During the collection 300 of routing information, each router may receive multiple route request messages 304, such as route request messages 304 from all other routers that are visible. The source of each of these messages is identified and stored in the link map 306. As the messages 302, 304 propagate through the mesh network 100, each of the routers 104a-104e eventually contains a link map 306 that identifies all other routers that are visible to that router.

In some embodiments, the central controller 102 may limit the number of times the messages 304 are re-broadcast during the link discovery process and/or limit the routers that participate in the link discovery process. For example, the central controller 102 may specify a value that limits the number of times that the same route request message 304 may be forwarded in the mesh network 100, where the value relates to the number of routers 104a-104e currently in the mesh network 100. As a particular example, the central controller 102 may indicate that a route request message 304 cannot be forwarded more than five times in the mesh network 100. In this way, the link discovery process may be achieved more efficiently. Depending on the size and layout of the mesh network 100, this may also prevent at least some of the routers from participating in the link discovery process.

After the link discovery process, the collection 300 of routing information in the mesh network 100 concludes with a link reporting process. The link reporting process involves the routers 104a-104e providing the collected information in the link maps 306 to the central controller 102. Each of the routers 104a-104e generates a link list 308. The link list 308 contains an entry for each router 104a-104e, and the entry for a particular router identifies the communication links visible to that router. The link list 308 in each router initially contains only the information from that router's link map 306. As a result, the link list 308 initially identifies only the other routers visible to one particular router. For example, the link list 308 in router 104a would identify routers 104c-104e since all three routers are visible to router 104a. Similarly, the link list 308 in router 104b would only identify router 104e since only that router 104e is visible to router 104b.

Figure 5:
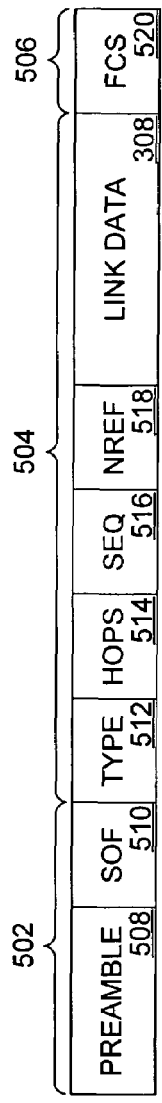
FIG. 5 illustrates an example message for reporting collected routing information in a mesh network according to one embodiment of this disclosure.

The routers 104a-104e transmit their link lists 308 to the central controller 102 in link response messages 310. The link response messages 310 provide the collected information about visible communication links between the routers to the central controller 102. The link response messages 310 may have any suitable contents and format. One example embodiment of the link response messages 310 is shown in FIG. 5, which is described below.

In some embodiments, each router that receives a link response message 310 from another router consolidates the link list 308 in the message 310 with its own link list 308. A router may receive a link response message 310 from another router and merge or overlay its link list 308 with the link list 308 in the message 310. That router then communicates a link response message 310 containing the aggregate link list to yet another router or to the central controller 102. Eventually, the central controller 102 receives a consolidated link list 312, which contains routing information from multiple routers in the mesh network 100. In particular embodiments, every router that participates in the link discovery process also participates in consolidating its link list 308 with other routers' link lists 308. In these embodiments, the central controller 102 may receive a single consolidated link list 312 containing routing information from every router in the mesh network 100 that participating in the link discovery process.

The communications shown in FIG. 3 may occur in any suitable manner. For example, the communications shown in FIG. 3 may occur in a synchronized, non-contentious fashion using the synchronization technique 200 shown in FIG. 2 and described above. In this way, the routers 104a-104e may participate in the link discovery and link reporting processes with fewer or no collisions during data transmissions.

Although FIG. 3 illustrates one example of the collection 300 of routing information in a mesh network, various changes may be made to FIG. 3. For example, any other or additional types of messages could be used to initiate collection and to report collected information.

FIG. 4 illustrates an example message for initiating collection of routing information in a mesh network according to one embodiment of this disclosure. In particular, FIG. 4 illustrates a find link request message 302 and/or a route request message 304 that is used to initiate collection of routing information in routers 104a-104e in the mesh network 100. The embodiment of the messages 302, 304 shown in FIG. 4 is for illustration only. Other embodiments of the messages 302, 304 may be used without departing from the scope of this disclosure. Also, the different messages 302, 304 could have different structures and/or contents.

In this example, the message 302, 304 includes a header 402, a body 404, and a tail 406. The header 402 includes a preamble 408 and a start of frame ("SOF") marker 410. The preamble 408 and the SOF marker 410 may contain any suitable information. For example, the preamble 408 could contain bit synchronization information, and the SOF marker 410 could contain character synchronization information. This synchronization information allows the router receiving the message 302, 304 to be synchronized with the bits and characters in the message 302, 304. The preamble 408 and the SOF marker 410 could contain any other or additional information.

The body 404 of the message 302, 304 includes various fields. A type 412 identifies the message type of message 302, 304. For example, the type 412 could identify the message as a find link request message 302 or a route request message 304.

A hops value 414 identifies the number of routers 104a-104e to participate in the link discovery process. The hops value 414 also identifies the maximum number of hops or relays needed for a message from the central controller 102 to reach a router participating in the link discovery process. A sequence ("SEQ") value 416 identifies the current iteration of the message 302, 304, or the number of times that this message 302, 304 has been received and forwarded during the link discovery process. In some embodiments, the central controller 102 may not know ahead of time how the routers are arranged and how the messages 302, 304 will propagate through the mesh network 100. This is due, for example, to the fact that the routers participating in the link discovery process may have any suitable arrangement and this arrangement may change over time if any of the routers are mobile. The hops value 414 and the sequence value 416 help to ensure that the specified number of routers participate in the link discovery process and that a sufficient number of time slots 202 are allocated so that the routers may receive the messages 302, 304 and respond. In particular embodiments, the hops value 414 remains constant during the link discovery process, while the sequence value 416 is incremented during the link discovery process and is used to determine an end to the link discovery process.

A network reference ("NREF") value 418 represents a value used to control when the routers participating in the link discovery process transmit data. The network reference value 418 is dynamic and is updated for each new time slot 202. For example, the network reference value 418 could be incremented at each time slot 202 until a maximum value is reached and then decremented at each time slot 202 until a minimum value is reached. In some embodiments, each of the routers 104a-104e has a unique identifier, and a router is allowed to transmit in a time slot 202 only when its unique identifier matches the network reference value 418 for that time slot 202.

The tail 406 of the message 302, 304 includes a frame check sequence ("FCS") 420. The frame check sequence 420 contains information that is used to validate the message 302, 304. For example, the frame check sequence 420 could contain information allowing the router receiving the message 302, 304 to verify that the message 302, 304 contains no errors.

Although FIG. 4 illustrates one example of a message for initiating collection of routing information in a mesh network, various changes may be made to FIG. 4. For example, the contents and arrangement of the message shown in FIG. 4 are for illustration only. The message could include any other or additional contents in any other arrangement.

FIG. 5 illustrates an example message for reporting collected routing information in a mesh network according to one embodiment of this disclosure. In particular, FIG. 5 illustrates a link response message 310 that is used to report collected routing information from the routers 104a-104e to the central controller 102 in the mesh network 100. The embodiment of the link response messages 310 shown in FIG. 5 is for illustration only. Other embodiments of the link response messages 310 may be used without departing from the scope of this disclosure.

In this example, the message 310 includes a header 502, a body 504, and a tail 506. The header 502 includes a preamble 508 and SOF marker 510. The body 504 includes a type 512, a hops value 514, a sequence value 516, a network reference value 518, and a link list 308. The tail 506 includes a frame check sequence 520. Much of the information in the header 502, body 504, and tail 506 is the same as or similar to information in the header 402, body 404, and tail 406, respectively, from FIG. 4. In this example, the type 508 would identify the message as a link response message 310.

The link list 308 in the link response messages 310 contains the information collected by one or more of the routers 104a-104e and stored in the link map(s) 306 of the router(s). When a router generates the link response messages 310, the router initially populates the link list 308 in the message 310 with the contents of that router's link map 306. The router may or may not receive another router's link response messages 310 before transmitting its own link response messages 310. If the router does receive another router's link response messages 310 before transmitting its own link response messages 310, the router consolidates the link list 308 in the other router's message 310 with the link list 308 in that router's message 310. The router then transmits the message 310 containing the consolidated link list 308.

In particular embodiments, each router transmits its link response messages 310 only once during the link reporting process. Also, the routers 104a-104e may transmit the link response messages 310 during the link reporting process in an order that is reversed from the order in which the routers 104a-104e transmitted the route request messages 304 during the link discovery process.

Although FIG. 5 illustrates one example of a message for reporting collected routing information in a mesh network, various changes may be made to FIG. 5. For example, the contents and arrangement of the message shown in FIG. 5 are for illustration only. The message could include any other or additional contents in any other arrangement.

Figure 6:
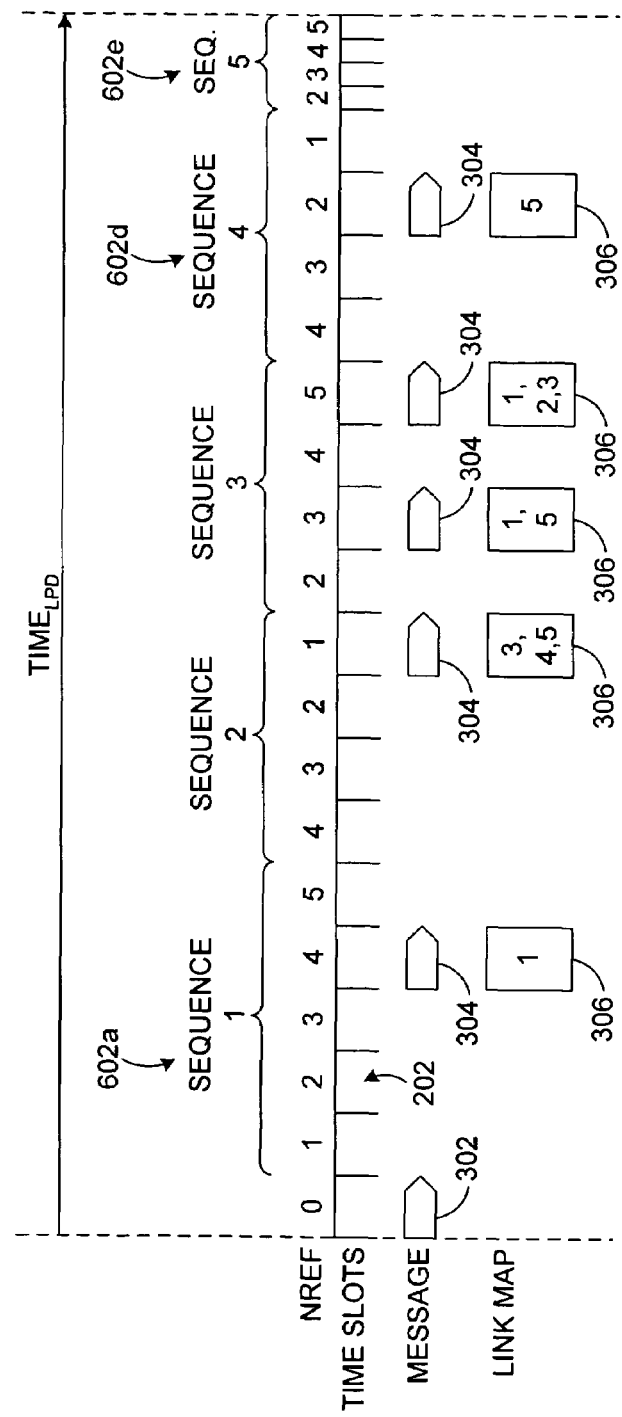
FIG. 6 illustrates an example link discovery process for collecting routing information in a mesh network according to one embodiment of this disclosure.

FIG. 6 illustrates an example link discovery process 600 for collecting routing information in a mesh network according to one embodiment of this disclosure. In particular, FIG. 6 illustrates how the messages 302, 304 shown in FIG. 4 are used to initiate collection of routing information in the mesh network 100. The link discovery process 600 shown in FIG. 6 is for illustration only. Other embodiments of the mesh network 100 that operate using different link discovery processes may be used without departing from the scope of this disclosure.

In this example, the link discovery process 600 begins with the central controller 102 generating and communicating a find link request message 302 to at least one router (such as router 104d). In some embodiments, the hops value 414 in the find link request message 302 is set to the number of routers to participate in the link discovery process. For the embodiment of the mesh network 100 shown in FIG. 1, the hops value 414 could be set to a value of five. The sequence value 416 in the find link request message 302 is initialized to a value of one, and the network reference value is initialized to a value of zero. The find link request message 302 is then transmitted during the first time slot 202 shown in FIG. 6.

After the first time slot 202, the central controller 102 begins incrementing the network reference value at each new time slot 202 until a maximum value is reached. After that, the central controller 102 decrements the network reference value at each new time slot 202 until a minimum value is reached. This process is repeated throughout the link discovery process 600.

In FIG. 6, the process of incrementing and decrementing the network reference value is divided into sequences 602a-602e. Each of these sequences 602a-602e represents a period of time where the network reference value is either (a) incremented up to a maximum value or (b) decremented down to a minimum value. In this example, the network reference value may have a value between one and five during the sequences 602a-602e, and these values correspond to routers 104a-104e, respectively. The sequence value 416 in the message 302 is initially set to a value of one, and the sequence value 416 in any route request messages 304 is incremented at each new sequence.

The router 104d is the only router in the mesh network 100 of FIG. 1 that receives the find link request message 302. The router 104d synchronizes with the time slots 202 used by the central controller 102 using the message 302. The router 104d also synchronizes with the network reference value used by the central controller 102. For example, the router 104d may use the network reference value contained in the message 302 and increment or decrement the value at each new time slot 202.

The router 104d compares the network reference value to its unique identifier and waits until those values are equal. For example, the router 104d (referred to as "Router #4") may have a unique identifier such as a value of four. The router 104d transmits a route request message 304 when the network reference value equals the unique identified for the router 104d. The router 104d also generates a link map 306 identifying all of the routers in the mesh network 100 that are visible to the router 104d. In this example, only router 104a (Referred to as "Router #1" and identified with a value of "1") is visible to router 104d.

Router 104a receives the route request message 304 from the router 104d. Router 104a synchronizes with the time slots 202 and the network reference value using the received message 304. Router 104a transmits a route request message 304 when the network reference value equals one. Router 104a also generates a link map 306, which indicates that routers 104c-104e are all visible to router 104a.

Routers 104c-104e receive the route request message 304 from the router 104a. Router 104d need not perform any additional actions since it has already generated its link map 306. Routers 104c and 104e synchronize with the time slots 202 and the network reference value using the received message 304. The router 104c (referred to as "Router #3") transmits a route request message 304 when the network reference value equals three, and the router 104e (referred to as "Router #5") transmits a route request message 304 when the network reference value equals five. The routers 104c and 104e also generate link maps 306.

Routers 104a and 104e receive the route request message 304 from router 104c. Routers 104a-104c receive the route request message 304 from router 104e. Routers 104a, 104c, 104e need not perform any additional actions since they have already generated their link maps 306. Router 104b receives the route request message 304 from the router 104e. Router 104b synchronizes with the time slots 202 and the network reference value using the received message 304. Router 104b (referred to as "Router #2") transmits a route request message 304 when the network reference value equals two. Router 104b also generates a link map 306, which indicates that only router 104e is visible to router 104b.

At the end of sequence 602d, all of the routers 104a-104e have received a link request message 302 or route request message 304 and generated a link map 306. All of the communication links between the routers 104a-104e in the mesh network 100 have been identified. However, the routers 104a-104e may wait for one more sequence 602e (having four time slots 202) to complete before the link discovery process 600 ends. While in this example the five routers 104a-104e were contacted within four sequences 602a-602d, the routers 104a-104e could have been arranged linearly, which would require five sequences before all routers 104a-104e were contacted.

As shown in FIG. 6, the maximum amount of time needed to complete the link discovery process 600 is denoted as "Time$_{LDP}$". In some embodiments, the maximum time needed for the link discovery process 600 may be calculated by the central controller 102 as:

$$\text{Time}_{LDP}=\text{HOPS}^2-\text{HOPS}+2 \qquad (1)$$

where HOPS represents the hops value 414 (which remains constant during the link discovery process 600). In this example, the hops value 414 equals five, and Time$_{LDP}$ equals 22 (and the number of time slots 202 in FIG. 6 equals 22). While in this example all of the routers 104a-104e have received messages 302, 304 by the fourth sequence 602d, the worst case arrangement of the routers 104a-104e would require all 22 time slots 202. As a result, the central controller 102 may determine when the link discovery process 600 would end, no matter how the routers involved in the link discovery process 600 are arranged.

Although FIG. 6 illustrates one example of a link discovery process 600 for collecting routing information in a mesh network, various changes may be made to FIG. 6. For example, the timing of the various messages 304 shown in FIG. 6 is based on the layout of the routers 104a-104e in FIG. 1. The timing of the messages 304 shown in FIG. 6 would vary if the layout of the routers 104a-104e changes.

Figure 7:
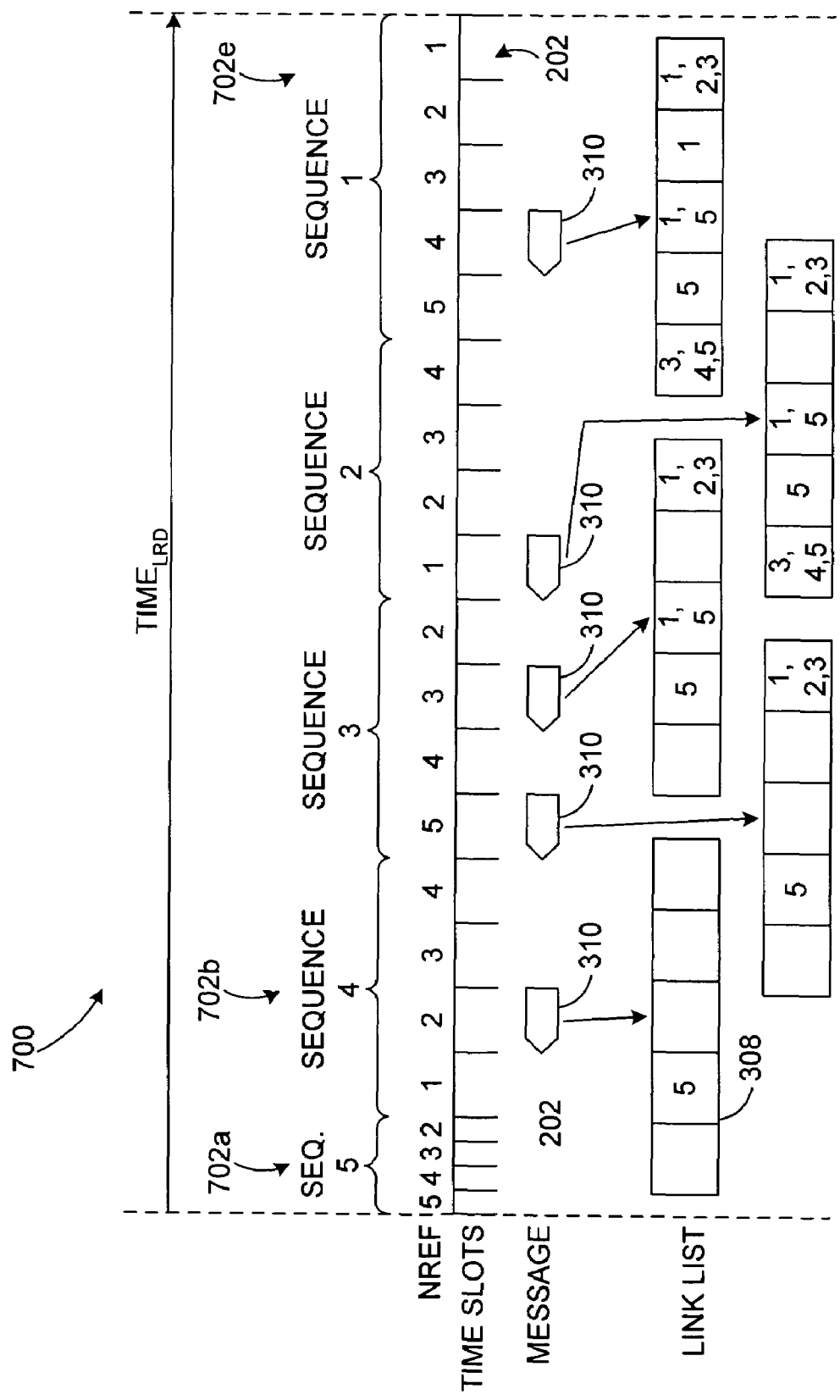
FIG. 7 illustrates an example link reporting process for reporting collected routing information in a mesh network according to one embodiment of this disclosure.

FIG. 7 illustrates an example link reporting process 700 for reporting collected routing information in a mesh network according to one embodiment of this disclosure. In particular, FIG. 7 illustrates how the messages 310 shown in FIG. 5 are used to report collected routing information to the central controller 102 in the mesh network 100. The link reporting process 700 shown in FIG. 7 is for illustration only. Other embodiments of the mesh network 100 that operate using different link reporting processes may be used without departing from the scope of this disclosure.

In this example, the link reporting process 700 includes additional sequences 702a-702e in which the network reference value is incremented and decremented. Each of the routers 104a-104e transmits a link response message 310 containing a link list 308. As with the link reporting process 600, each of the routers 104a-104e transmits its link response message 310 only when the network reference value equals a unique identifier associated with that router. Also, the sequences 702a-702e and the timing of the messages 310 shown in FIG. 7 represent the reverse timing shown in FIG. 6.

As shown in FIG. 7, the first router to transmit its link response message 310 is router 104b (referred to as "Router #2"), and the link response message 310 is transmitted when the network reference value equals two. The link response message 310 from router 104b contains a link list 308 where one entry (the second entry corresponding to router 104b) contains the routing information collected by the router 104b.

The only router to receive the link response message 310 from the router 104b is router 104e. The router 104e generates a link response message 310 containing a link list 308, where the link list 308 contains the routing information collected by the router 104b and router 104e. The router 104e (referred to as "Router #5") then transmits its link response message 310 when the network reference value equals five.

Routers 104a-104c receive the link response message 310 from the router 104e. The router 104b need not perform any additional functions because it has already transmitted its link response message 310. Also, each of the routers 104a and 104c generates its own link response message 310 having a link list 308. Each of the routers 104a and 104c inserts the information from its own link map 306 into the link list 308 and the routing information contained in the link response message 310 from router 104e. Router 104c (referred to as "Router #3") transmits its link response message 310 when the network reference value equals three.

Routers 104a and 104e receive the link response message 310 from router 104c. Router 104e need not perform any actions since it has already transmitted its link response message 310. Router 104a has previously generated its own link response message 310. Router 104a then consolidates any new information in the link response message 310 from the router 104c into its own link response message 310. Router 104a (referred to as "Router #1") then transmits its link response message 310 when the network reference value equals one.

Routers 104c-104e receive the link response message 310 from the router 104a. Routers 104c and 104e need not perform any actions since they have already transmitted their link response messages 310. Router 104d generates its link response message 310, inserts the information from its link map 306 into the link list 308 in its own message 310, and inserts the information from the received message 310 into the link list 308 in its own message 308. Router 104d (referred to as "Router #4") then transmits its link response message 310 when the network reference value equals four.

At this point, the central controller 102 receives the link response message 310 from the router 104d. This link response message 310 contains routing information from all routers 104a-104e that participated in the link discovery process 600 and the link reporting process 700. The link list 308 in this link response message 310 identifies all communication links between the routers 104a-104e. The central controller 102 may then use this information in any suitable manner, such as by using the information to route information to the user endpoints 106a-106d.

As shown in FIG. 7, the maximum amount of time needed to complete the link reporting process 700 is denoted as "Time$_{LRP}$". In some embodiments, the maximum time needed for the link reporting process 700 may be calculated by the central controller 102 as:

$$\text{Time}_{LRP}=\text{HOPS}^2-\text{HOPS}+1. \qquad (2)$$

In this example, the hops value 414 equals five, and Time$_{LRP}$ equals 21 (and the number of time slots 202 in FIG. 7 equals 21). As with FIG. 6, all of the routers 104a-104e have transmitted their link response messages 310 within four sequences 702b-702e, the worst case arrangement of the routers 104a-104e would require all 21 time slots 202. As a result, the central controller 102 may determine when the link reporting process 700 would end, no matter how the routers involved in the link reporting process 700 are arranged.

Although FIG. 7 illustrates one example of a link reporting process 700 for reporting collected routing information in a mesh network, various changes may be made to FIG. 7. For example, the timing of the various messages 310 shown in FIG. 7 is based on the layout of the routers 104a-104e in FIG. 1. The timing of the messages 310 shown in FIG. 7 would vary if the layout of the routers 104a-104e changes.

Figure 8:
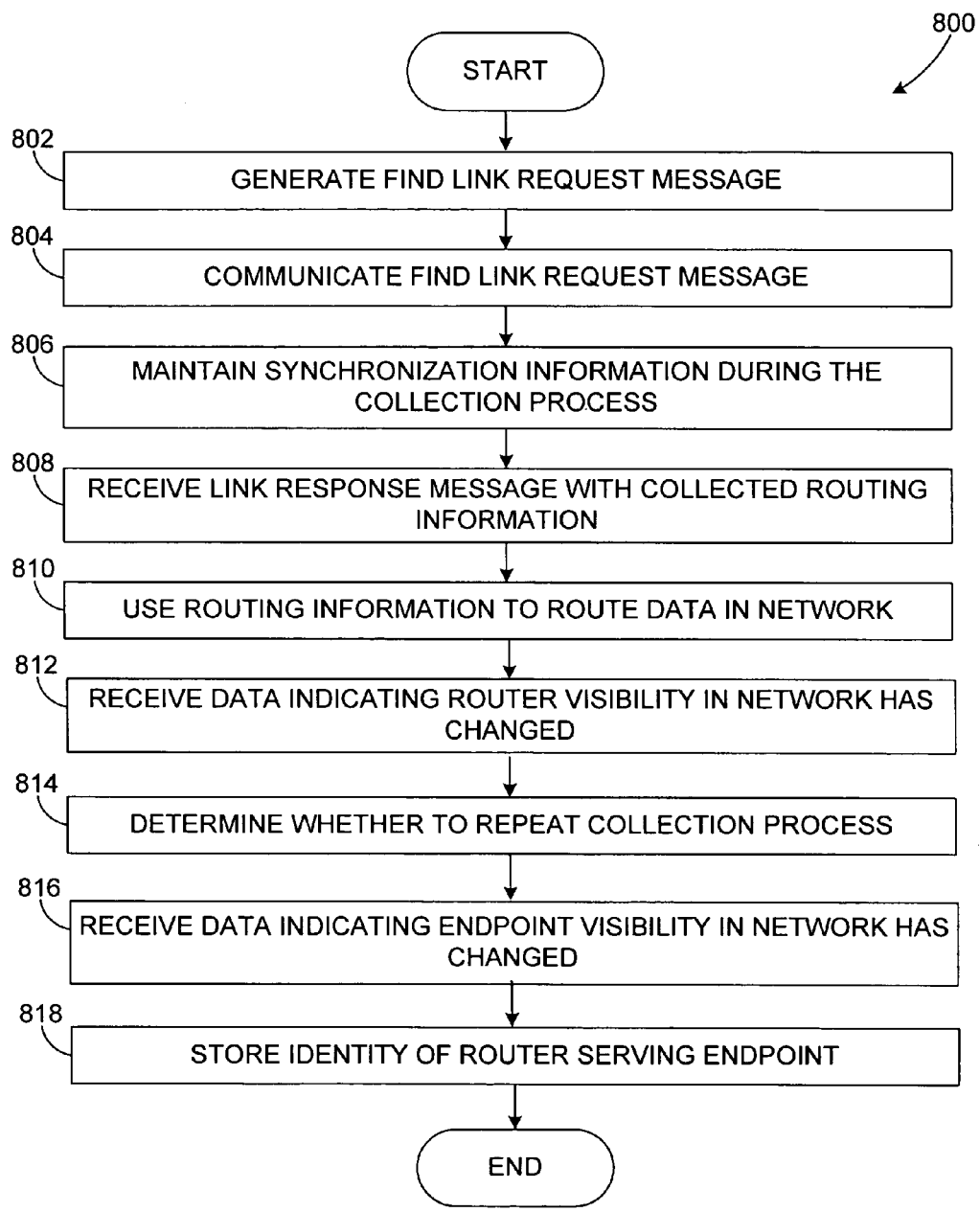
FIG. 8 illustrates an example method for collecting routing information in a mesh network at a central controller according to one embodiment of this disclosure.

FIG. 8 illustrates an example method 800 for collecting routing information in a mesh network at a central controller according to one embodiment of this disclosure. For ease of explanation, the method 800 is described with respect to the central controller 102 operating in the mesh network 100 of FIG. 1. The method 800 could be used by any other device and in any other system without departing from the scope of this disclosure.

The central controller 102 generates a find link request message at step 802. This may include, for example, the central controller 102 generating a find link request message 302 as shown in FIG. 4.

The central controller 102 communicates the find link request message at step 804. This may include, for example, the central controller 102 broadcasting the find link request message 310 to any of the routers 104a-104e within range of the central controller 102.

The central controller 102 maintains synchronization information during the collection process at step 806. This may include, for example, the central controller 102 identifying the time slots 202, incrementing and decrementing the hops value 414, 514 when appropriate, and incrementing and decrementing the sequence value 416, 516 when appropriate.

The central controller 102 receives a link response message containing the collected routing information at step 808. This may include, for example, the central controller receiving a link response message 310 containing a link list 308, where the link 308 contains routing information collected by multiple routers. In particular embodiments, the link list 308 contains routing information collected by all of the routers 104a-104e in the mesh network 100.

The central controller 102 uses the collected routing information to route data in the mesh network at step 810. This may include, for example, the central controller 102 using the information to route data to particular user endpoints 106a-106d. At this point, the link discovery process and the link reporting process have completed.

The central controller 102 receives data indicating that router visibility has changed in the mesh network at step 812. This may include, for example, the central controller 102 receiving one or more messages indicating that one or more routers 104a-104e have set their link discovery update flag. The link discovery update flag indicates that the associated router has identified at least one other router that is visible and that was not visible during the prior collection process.

The central controller 102 determines whether to repeat the collection process at step 814. This may include, for example, the central controller 102 identifying the routers 104a-104e that have reported new visibility in the mesh network 100. This may also include the central controller 102 comparing the number of routers 104a-104e reporting new visibility to a threshold value. The central controller 102 may use any other suitable technique or criteria to determine when to repeat the collection process. If the collection process is to be repeated, the central controller 102 may repeat the method 800.

The central controller 102 receives data indicating that endpoint visibility has changed in the mesh network at step 816. This may include, for example, the central controller 102 receiving one or more messages indicating that one or more routers 104a-104e have detected new user endpoints that are visible to those router(s). The central controller 102 stores the identity of the router serving a new endpoint at step 818. This may include, for example, the central controller 102 storing the unique identifier of the router serving a new endpoint.

Although FIG. 8 illustrates one example of a method 800 for collecting routing information in a mesh network at a central controller, various changes may be made to FIG. 8. For example, the central controller 102 could communicate with two or more separate groups of routers, where there is no interconnection between the routers. In this case, the central controller 102 may receive a link response message 310 from each group of routers.

Figure 9A:
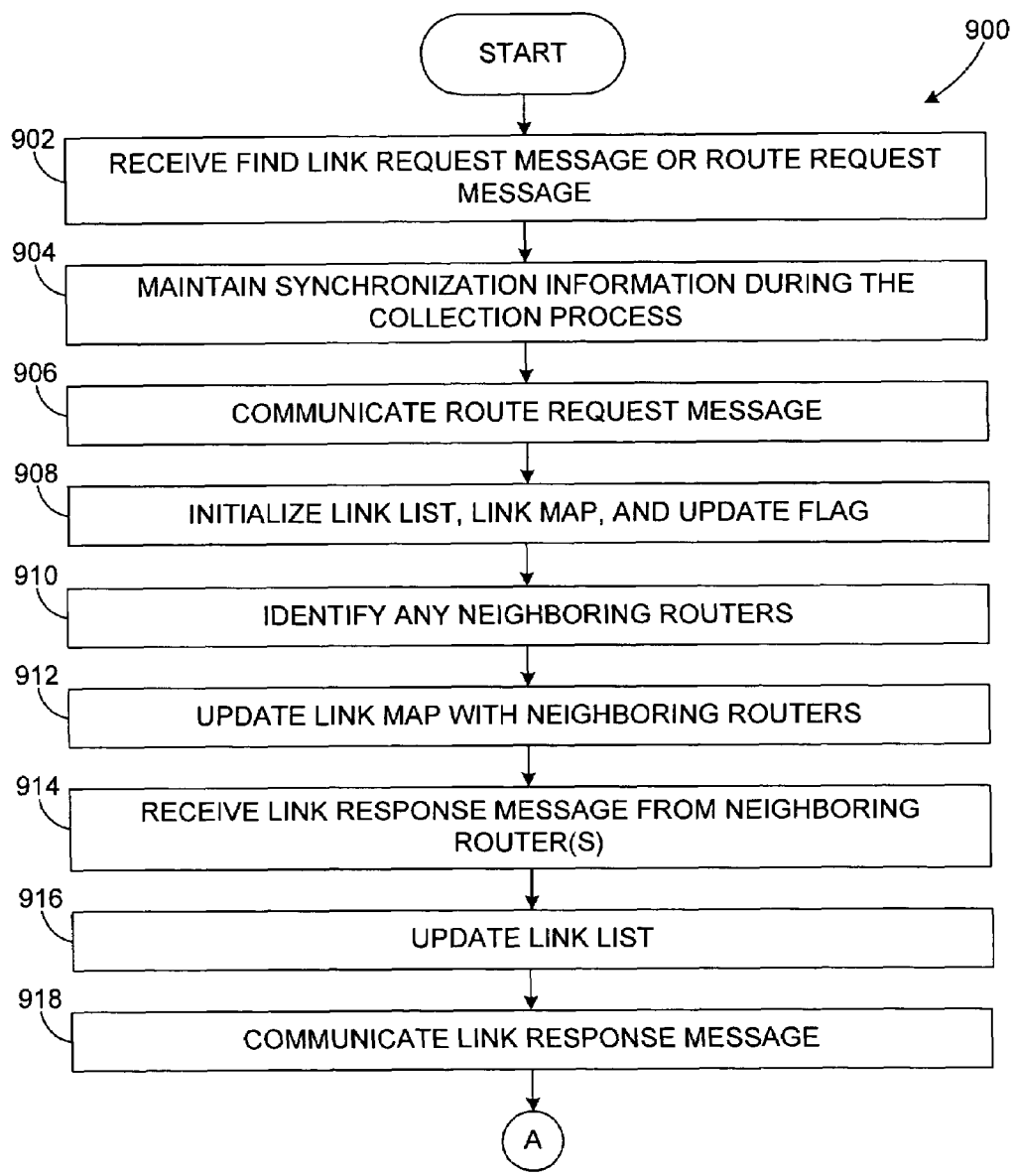
FIGS. 9A and 9B illustrate an example method for collecting and reporting routing information at a router in a mesh network according to one embodiment of this disclosure.
Figure 9B:
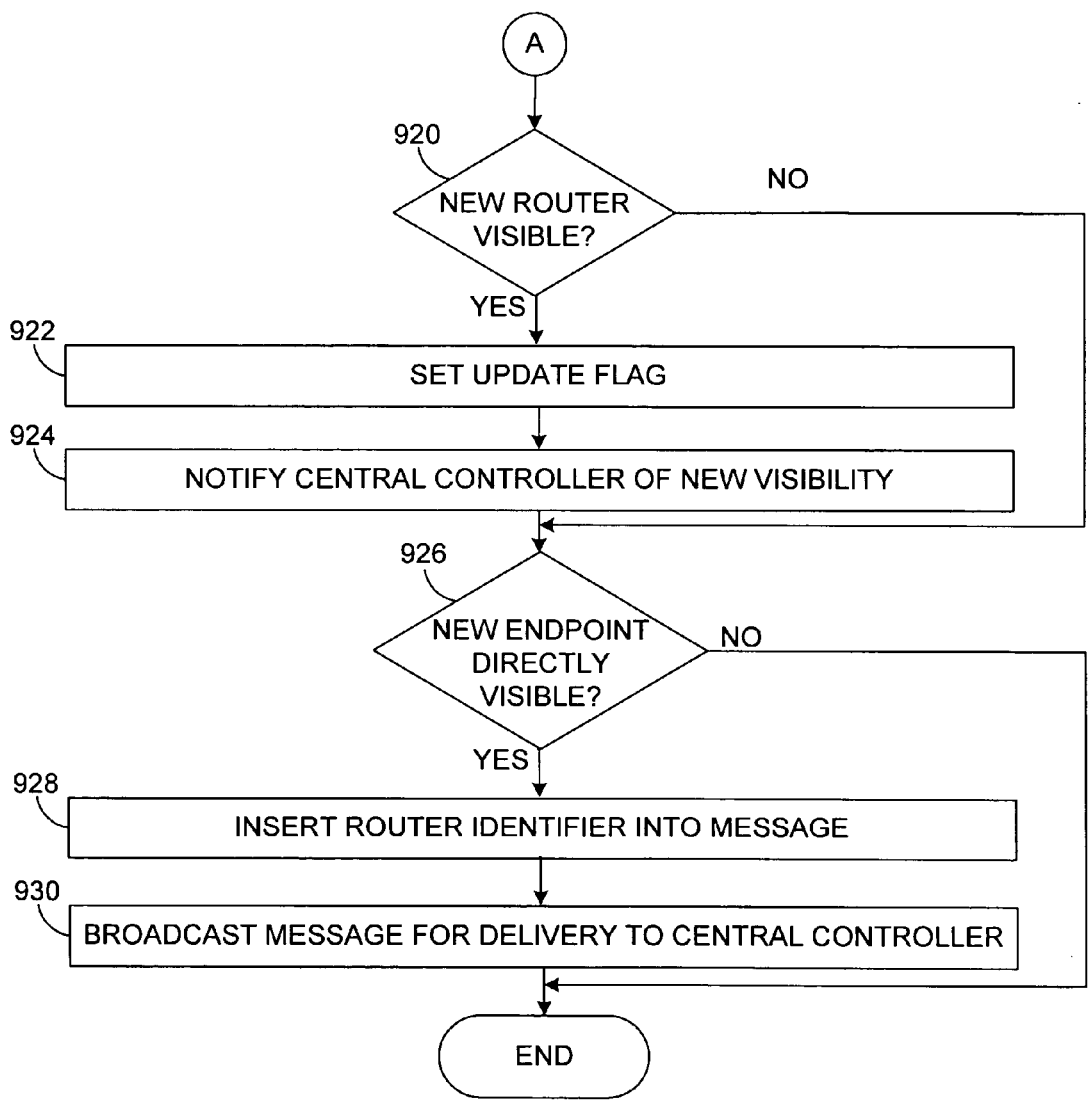

FIGS. 9A and 9B illustrate an example method 900 for collecting and reporting routing information at a router in a mesh network according to one embodiment of this disclosure. For ease of explanation, the method 900 is described with respect to one of the routers 104a-104e operating in the mesh network 100 of FIG. 1. The method 900 could be used by any other device and in any other system without departing from the scope of this disclosure.

A router receives a find link request message or a route request message at step 902. This may include, for example, the router 104d receiving a find link request message 302 from the central controller 102. This may also include the router 104a receiving a route request message 304 from the router 104d.

The router maintains synchronization information during the collection process at step 904. This may include, for example, the router using the received message 302, 304 to identify the time slots 202. This may also include the router incrementing and decrementing the hops value 414, 514 when appropriate and incrementing and decrementing the sequence value 416, 516 when appropriate.

The router communicates a route request message at step 906. This may include, for example, the router broadcasting the route request message 304 to any router within range.

The router initializes a link map, a link list, and an update flag at step 908. This may include, for example, the router initializing a link map 306 to identify no routers and a link list 308 having a number of entries equal to the hops value contained in the received message 302, 304. This may also include the router initializing a negative value for the link discovery update flag.

The router identifies any neighboring routers at step 910. This may include, for example, the router monitoring a frequency or frequencies used by the routers 104a-104e. This may also include the router determining if any signals identifying a neighboring router are received.

The router updates its link map with the identity of any identified neighboring routers at step 912. This may include, for example, placing unique identifiers associated with the identified neighboring routers in the link map 306.

The router receives a link response message from one or more of the neighboring routers at step 914. This may include, for example, the router receiving a link response message 310 containing a link list 308. The link list 308 contains routing information collected by one or more other routers in the mesh network 100.

The router updates its link list at step 916. This may include, for example, the router inserting information from the router's link map 306 into the router's link list 308. This may also include the router placing information from a link list 308 in the received link response message 310 into the router's link list 308.

The router communicates a link response message at step 918. This may include, for example, the router broadcasting a link response message 310 containing the router's link list 308. The link list 308 in this message 310 contains information from the router's link map 306 and from the received message 310. At this point, the link discovery process and the link reporting process have completed in the router.

The router determines whether a new router is visible at step 920. This may include, for example, the router receiving a message broadcast from the new router and determining that the new router was not visible during the link discovery process and the link reporting process. The new router may represent a router new to the mesh network 100 or a router that was already in the mesh network 100 but not visible earlier.

If a new router is visible, the router sets an update flag at step 922. This may include, for example, the router setting its link discovery update flag to an affirmative value. This indicates that at least one new router has become visible to the router since the last collection process. The router also notifies the central controller 102 of the new visibility at step 924. This may include, for example, the router embedding an indication that its update flag has been set in one, some, or all messages routed through that router to the central controller 102.

The router also determines whether a new user endpoint is directly visible at step 926. This may include, for example, the router receiving a message and determining that the message was broadcast by a new user endpoint. The new user endpoint may represent a user endpoint new to the mesh network 100 or a user endpoint that was already in the mesh network 100 but not visible earlier.

If a new user endpoint is detected, the router inserts its identifier into the message at step 928. This may include, for example, the router embedding a unique identifier associated with that router in the message. This may also include the router embedding into the message an indication that the user endpoint is newly visible to the router.

The router broadcasts the message for delivery to the central controller 102 at step 930. This may include, for example, the router broadcasting the message containing the embedded information directly to the central controller 102 or indirectly to the central controller 102 through one or more other routers.

Although FIGS. 9A and 9B illustrate one example of a method 900 for collecting and reporting routing information at a router in a mesh network, various changes may be made to FIGS. 9A and 9B. For example, the router may not receive a link response message from a neighboring router at step 914, and the router would update its link list 308 at step 916 only by placing the information from its link map 306 in the link list 308.

Figure 10A:
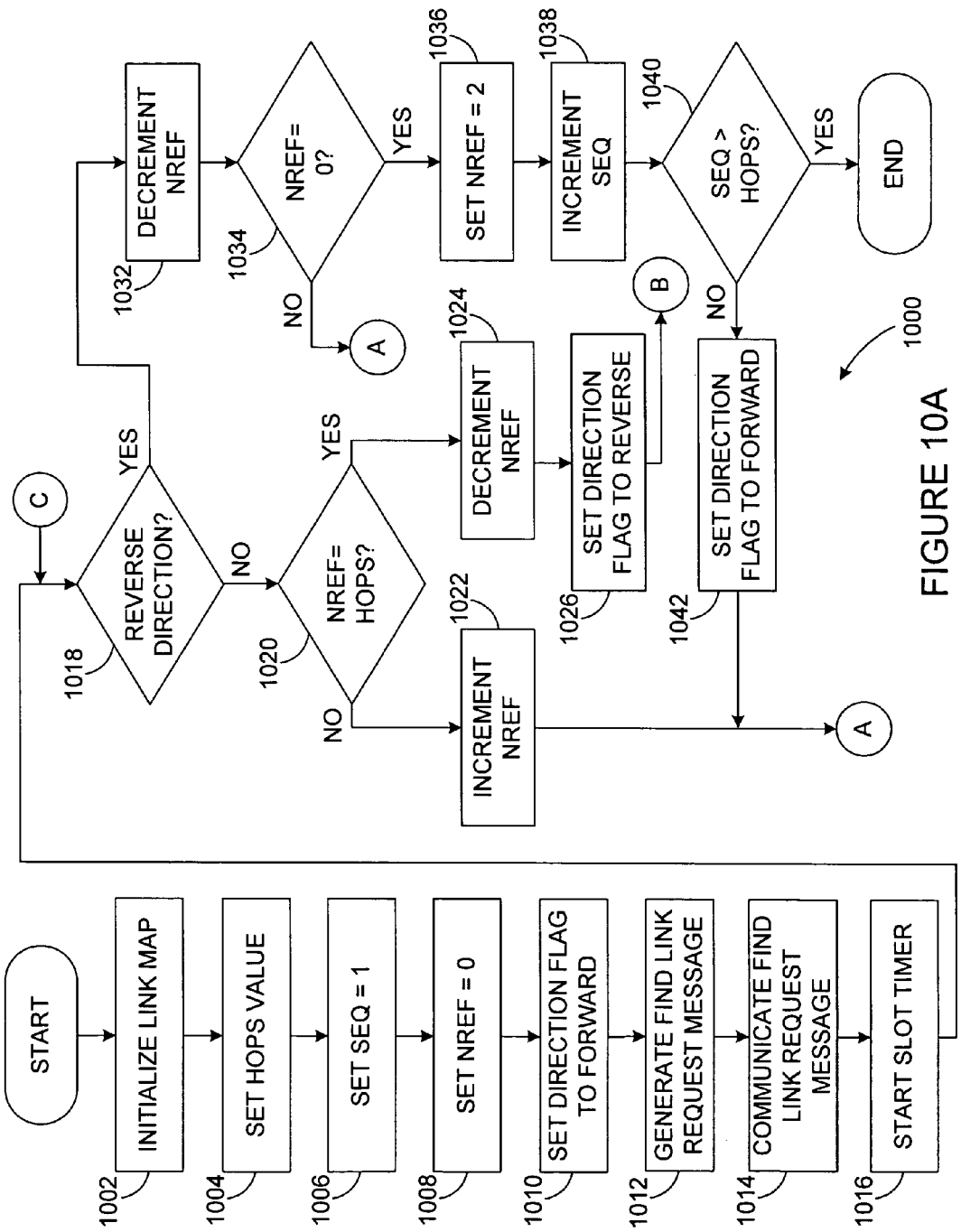
FIGS. 10A and 10B illustrate another example method for collecting routing information at a central controller in a mesh network according to one embodiment of this disclosure.
Figure 10B:
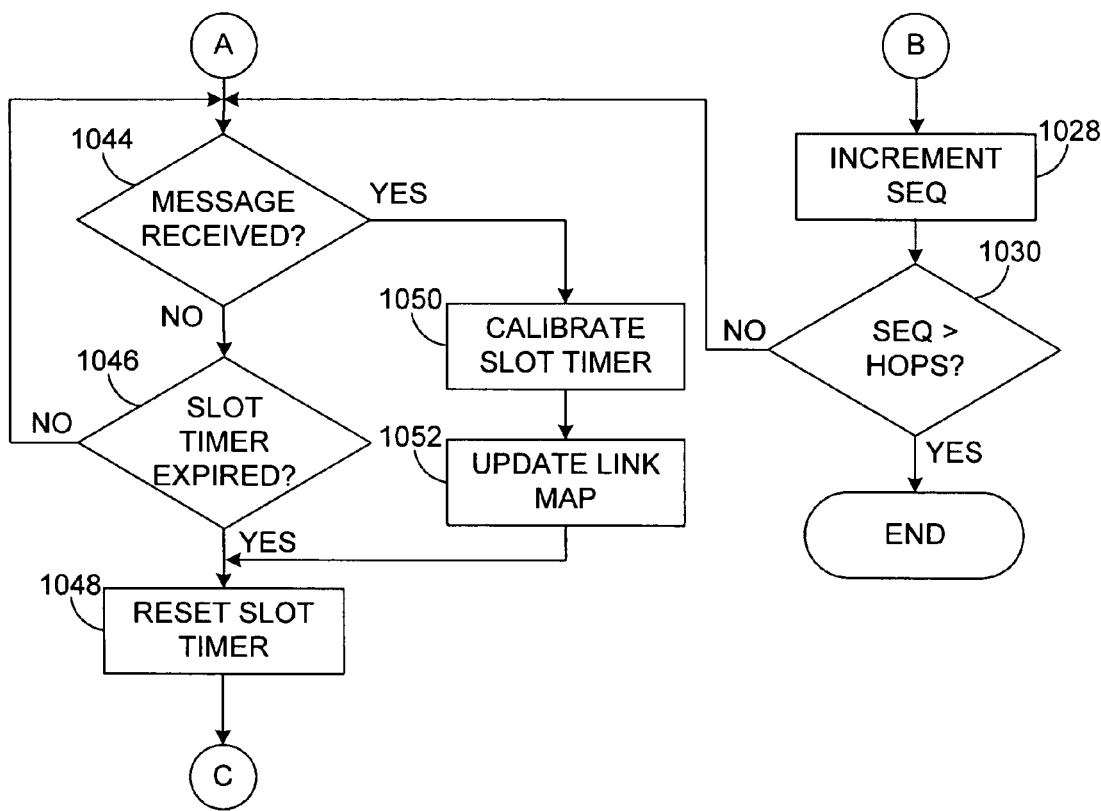

FIGS. 10A and 10B illustrate another example method 1000 for collecting routing information at a central controller in a mesh network according to one embodiment of this disclosure. For ease of explanation, the method 1000 is described with respect to the central controller 102 operating in the mesh network 100 of FIG. 1. The method 1000 could be used by any other device and in any other system without departing from the scope of this disclosure.

The central controller 102 initializes a link map 306 at step 1002. In this example, the central controller 102 may maintain a link map 306 identifying all of the routers that are visible to the central controller 102. This allows the central controller 102 to identify which of the routers 104a-104e are directly accessible to the central controller 102 and which of the routers 104a-104e are indirectly accessible through other routers.

The central controller 102 initializes a hops value at step 1004. This may include, for example, the central controller 102 setting the hops value 414 to a value identifying the number of routers to participate in the link discovery process. The central controller 102 also initializes a sequence value at step 1006 and a network reference value at step 1008. This may include, for example, the central controller setting the sequence value 416 to a value of one and the network reference value 418 to a value of zero. In addition, the central controller 102 initializes a direction flag at step 1010. This may include, for example, the central controller setting the direction flag to the forward direction. The direction flag indicates whether the network reference value 418 is incremented or decremented.

The central controller 102 generates a link request message at step 1012. This may include, for example, the central controller using the values 414-418 initialized above to generate the find link request message 302. The central controller 102 communicates the find link request message at step 1014.

The central controller 102 starts a slot timer at step 1016. The slot timer is set to a value equal to a message length 206 of the find link request message 302 plus a known length of additional time 208. The slot timer allows the central controller 102 to identify the time slots during the collection process.

The central controller 102 determines whether the direction flag is set to the reverse direction at step 1018. If so, the central controller 102 determines if the current network reference value equals the hops value at step 1020. If not, the network reference value 418 is being incremented and has not yet reached a maximum value (the hops value 414), and the network reference value 418 is incremented at step 1022. Otherwise, the network reference value 418 is being incremented and has reached the maximum value, and a sequence (such as one of sequences 602a-602e) has concluded. The network reference value is therefore decremented at step 1024, and the direction flag is set to a reverse direction at step 1026, and the sequence value is incremented at step 1028.

The central controller 102 determines if the sequence value exceeds the hops value at step 1030. If not, the link discovery process has not concluded. Otherwise, if the sequence value exceeds the hops value, the link discovery process has concluded, and the method 1000 ends.

If the direction flag is set to the reverse direction at step 1018, the central controller 102 decrements the network reference value at step 1032. The central controller 102 determines if the network reference value equals zero at step 1034. If not, the network reference value is being decremented and reached a minimum value. If the network reference value equals zero, the minimum value has been passed, so the network reference value is set to a value of two at step 1036. The sequence value is then incremented at step 1038.

The central controller 102 determines if the sequence value exceeds the hops value at step 1040. If not, the link discovery process has not concluded, and the central controller 102 sets to direction flag to the forward direction at step 1042. Otherwise, if the sequence value exceeds the hops value, the link discovery process has concluded. The central controller 102 may then wait to receive a link response message 310 containing a consolidated link list 308. The consolidated link list 308 contains information from multiple routers identifying the communication paths between the routers. The consolidated link list 308 may contain information from all of the routers 104a-104e identifying the communication paths between the routers.

After steps 1022, 1030, or 1042, the central controller 102 determines if any message is received from a neighboring router at step 1044. If not, the central controller 102 determines whether the current time slot has expired at step 1046. This may include, for example, the central controller 102 using the slot timer to determine if the current time slot 202 has expired. If not, the central controller 102 returns to step 1044.

If the current time slot has expired, the central controller 102 resets the slot timer at step 1048. This initiates a new time slot 202, and the central controller 102 returns to step 1018 to increment to decrement the network reference value.

If a message is received at step 1044, the central controller 102 calibrates its slot timer at step 1050. This may include, for example, the central controller 102 adjusting the time slots 202 as shown in FIG. 2 so that the time slots 202 are synchronized with the new message. The central controller 102 then updates its link map at step 1052. This may include, for example, the central controller 102 identifying the router that broadcast the received message and inserting the router's unique identifier into the link map 306 of the central controller 102. In this way, the central controller 102 identifies the routers that are visible to the central controller 102 and updates its link map 306 accordingly. The central controller 102 then returns to step 1018.

Although FIGS. 10A and 10B illustrate another example of a method 1000 for collecting routing information at a central controller in a mesh network, various changes may be made to FIGS. 10A and 10B. For example, FIGS. 10A and 10B illustrate one technique for maintaining synchronization in the mesh network 100 using various values and flags. Other synchronization techniques could also be used in the mesh network 100.

Figure 11A:
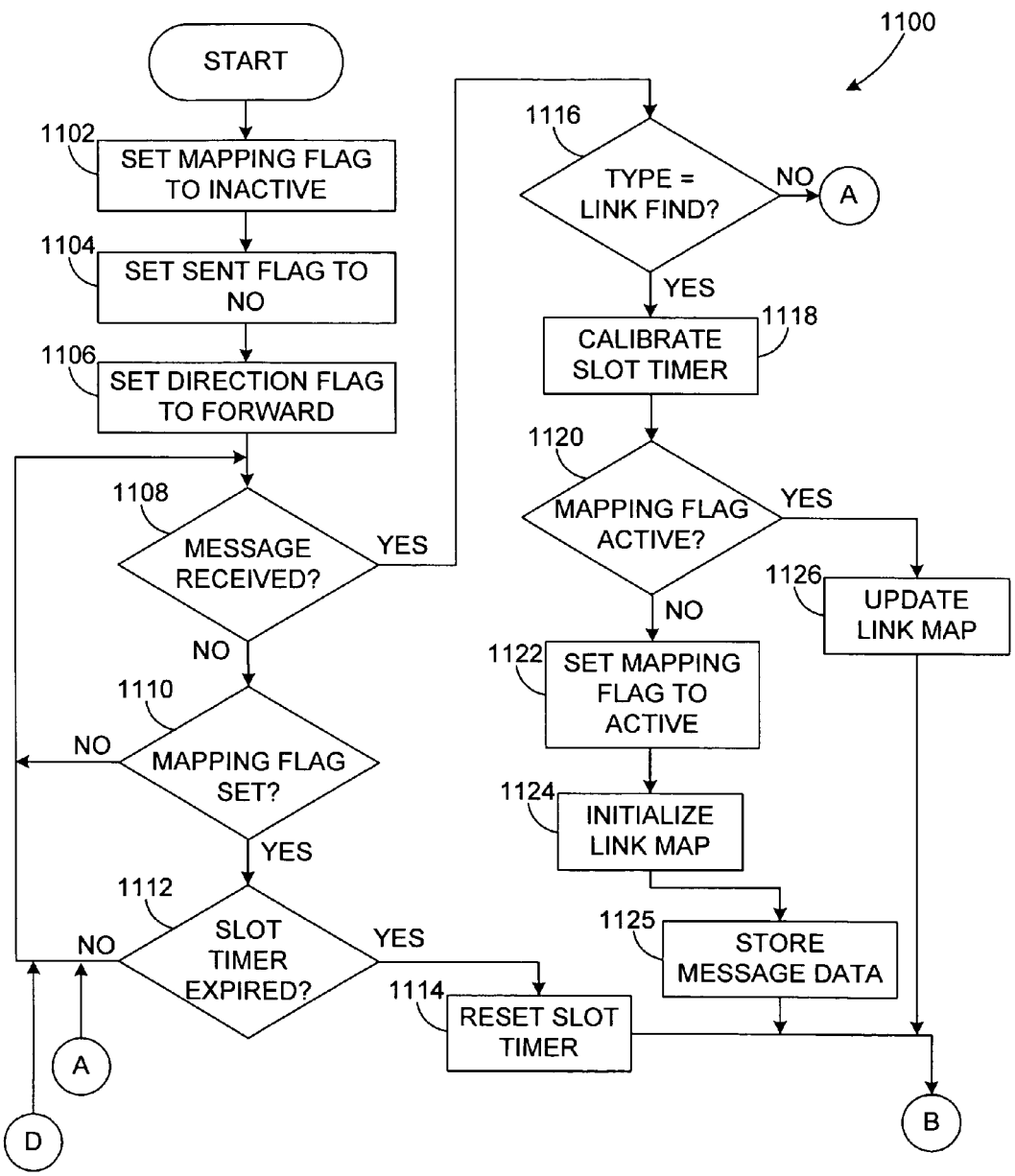
FIGS. 11A through 11C illustrate an example method for collecting routing information at a router in a mesh network according to one embodiment of this disclosure.
Figure 11B:
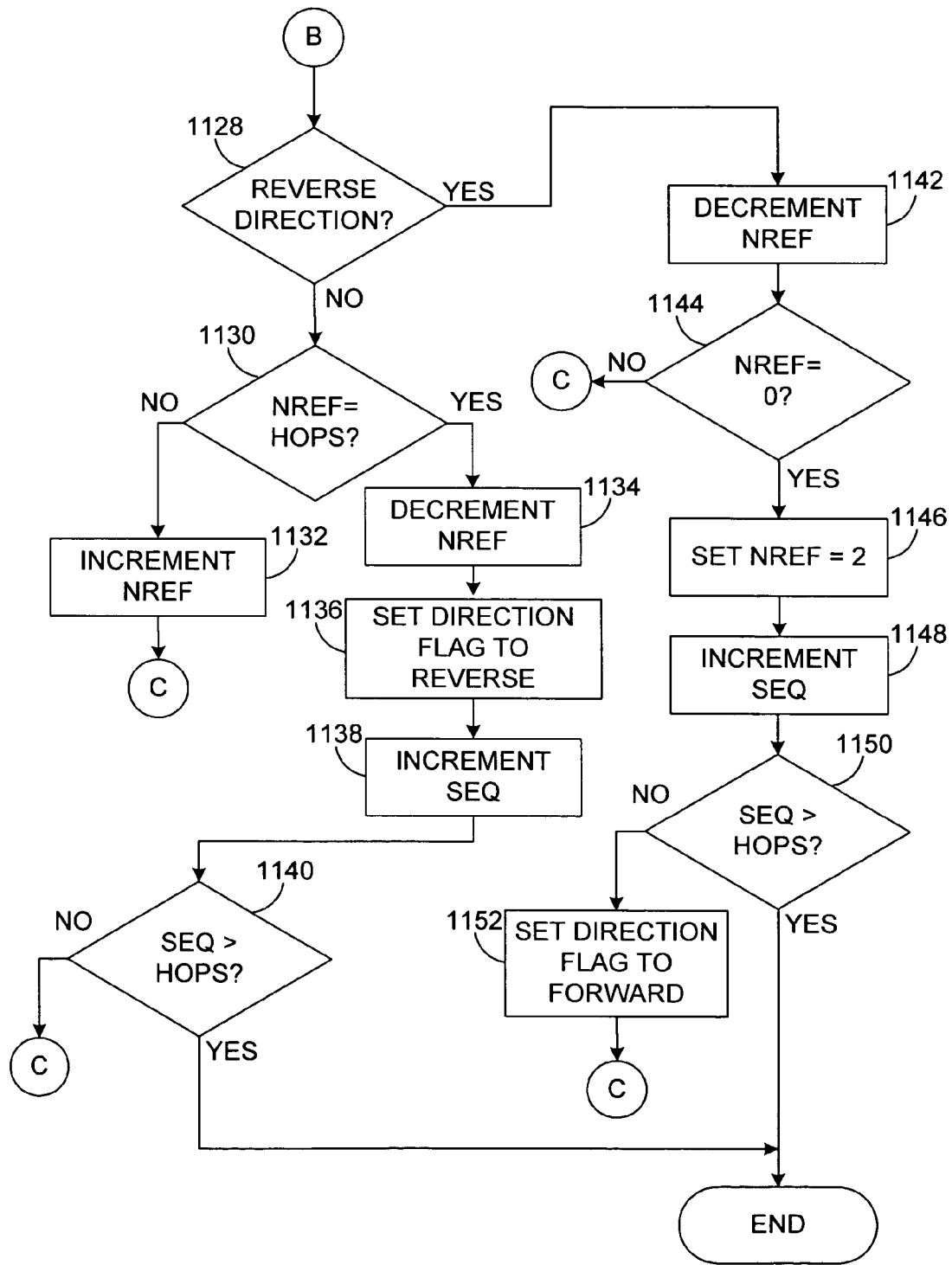
Figure 11C:
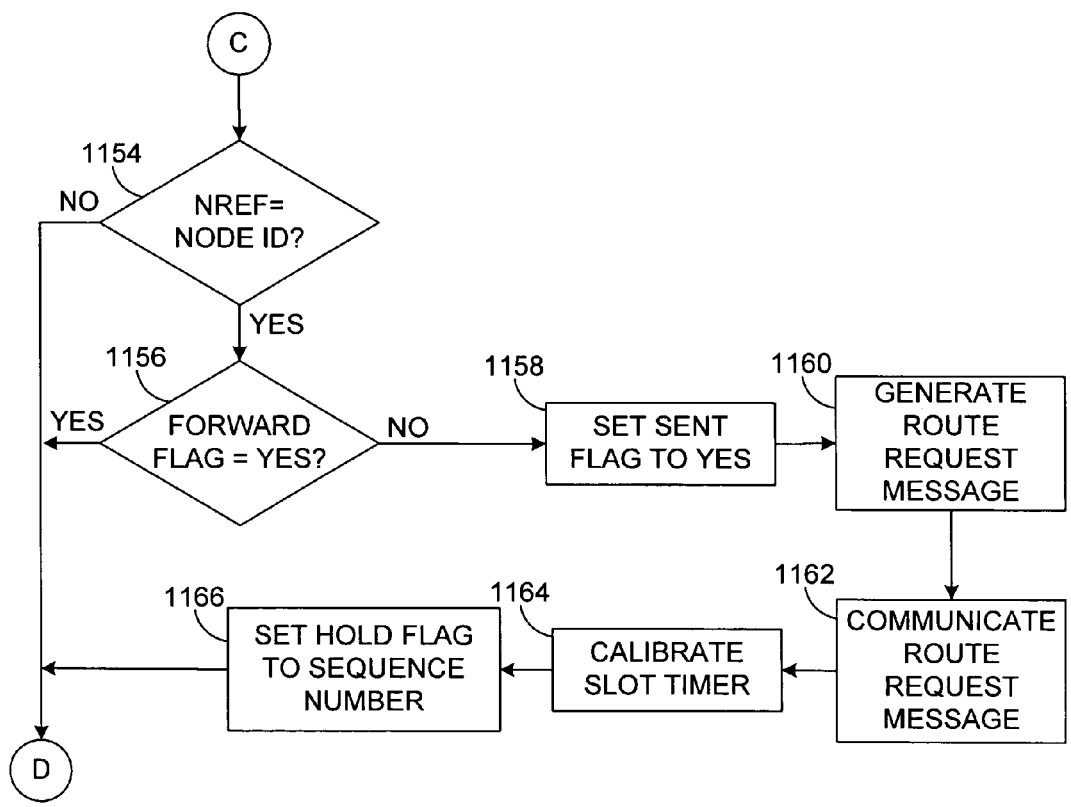

FIGS. 11A through 11C illustrate an example method 1100 for collecting routing information at a router in a mesh network according to one embodiment of this disclosure. In particular, FIGS. 11A through 11C illustrate an example method 1100 for collecting routing information during the link discovery process. For ease of explanation, the method 1100 is described with respect to one of the routers 104a-104e operating in the mesh network 100 of FIG. 1. The method 1100 could be used by any other device and in any other system without departing from the scope of this disclosure.

The router initializes a mapping flag to an inactive value at step 1102. The mapping flag is used by the router to indicate whether the router is currently participating in a link discovery process and link reporting process. The router initializes a sent flag to a negative value at step 1104. The sent flag indicates whether the router has already forwarded a route request message 304 during the collection process. The router initializes a direction flag to forward at step 1106. The direction flag indicates whether the network reference value is incremented or decremented.

The router determines if a message is received at step 1108. The message may, for example, represent a find link request message 302, a route request message 304, or a message unrelated to the collection process. If no message is received, the router determines whether it is currently engaged in a collection process using the mapping flag at step 1110. If not, the router returns to step 1108. If so, the router takes actions to maintain its synchronization with the time slots 202 during the collection process. In particular, the router determines if its slot timer has expired at step 1112. The router then returns to step 1108 if the slot timer has not expired or resets the slot timer at step 1114 if it has expired.

If a message was received at step 1108, the router determines if the message type indicates that the message is a "find link" type of message at step 1116. This may include, for example, the router determining if the message type indicates that the message is a find link request message 302 or a route request message 304. If not, the router returns to step 1108.

If the message is a "find link" type of message, the router calibrates its slot timer at step 1118. This may include, for example, the router adjusting the time slots 202 as shown in FIG. 2 so that the time slots 202 are synchronized with the new message.

The router determines whether the mapping flag is currently set to active at step 1120. As described above with respect to FIG. 6, a router may receive multiple route request messages 304 during the link discovery process, such as when router 104a receives a first route request message 304 from router 104d, a second route request message 304 from router 104c, and a third route request message 304 from router 104e. The mapping flag allows the router to determine if it is receiving a new request to collect routing information or a repeated request.

If the mapping flag is not set, the router sets the mapping flag to active at step 1122 and initializes a link map at step 1124. This may include, for example, the router creating a new link map 306. The router may also insert the identity of the component broadcasting the message (the message received at step 1108) into the link map 306. This indicates that the component broadcasting the message is visible to this router. The router stores information about the received message at step 1125. This may include, for example, the router storing the hops value 414, the sequence value 416, and the network reference value 418 of the message for use later during the link reporting process.

If the mapping flag is already active, the router updates its link map at step 1126. In this case, the router has already started collecting information about other visible routers, and the identity of the component broadcasting the message is placed into the link map 306.

At this point, the router performs steps 1128-1152. These steps 1128-1152 implement various functions required to maintain synchronization, such as maintaining an accurate network reference value so that the router transmits only in appropriate time slots 202.

Once these steps 1128-1152 are completed, the router determines if the network reference value equals the router's unique identifier at step 1154. If not, the router returns to step 1108 to await another message. Otherwise, the current time slot 202 represents a time slot belonging to the router.

The router uses the sent flag to determine whether it has broadcast a route request message 304 during the collection process at step 1156. If so, the router does not need to broadcast the message again, and the router returns to step 1108. Otherwise, the router sets the sent flag to an affirmative value at step 1158 and generates a route request message at step 1160. This may include, for example, the router generating a route request message 304 identifying the router as the source of the message. The router communicates the route request message at step 1162 and calibrates its slot timer to correspond to the time slots 202 as defined by the route request message at step 1164. The router sets a hold flag to the current sequence value at step 1166. The hold flag identifies the sequence value of the sequence during which the router transmitted the route request message 304. This value is used to ensure that the router transmits a link response message 310 during the corresponding sequence of the link reporting process. The router then returns to step 1108.

If each of the routers participating in the link discovery process performs these functions, each router transmits a single route request message 304 during the link discovery process. Also, each router maintains synchronization with the other components in the mesh network 100, and each router collects information identifying communication paths to and from that router.

Although FIGS. 11A through 11C illustrate one example of a method 1100 for collecting routing information at a router in a mesh network, various changes may be made to FIGS. 11A through 11C. For example, FIGS. 11A through 11C illustrate one technique for maintaining synchronization in the mesh network 100 using various values and flags. Other synchronization techniques could also be used in the mesh network 100.

Figure 12A:
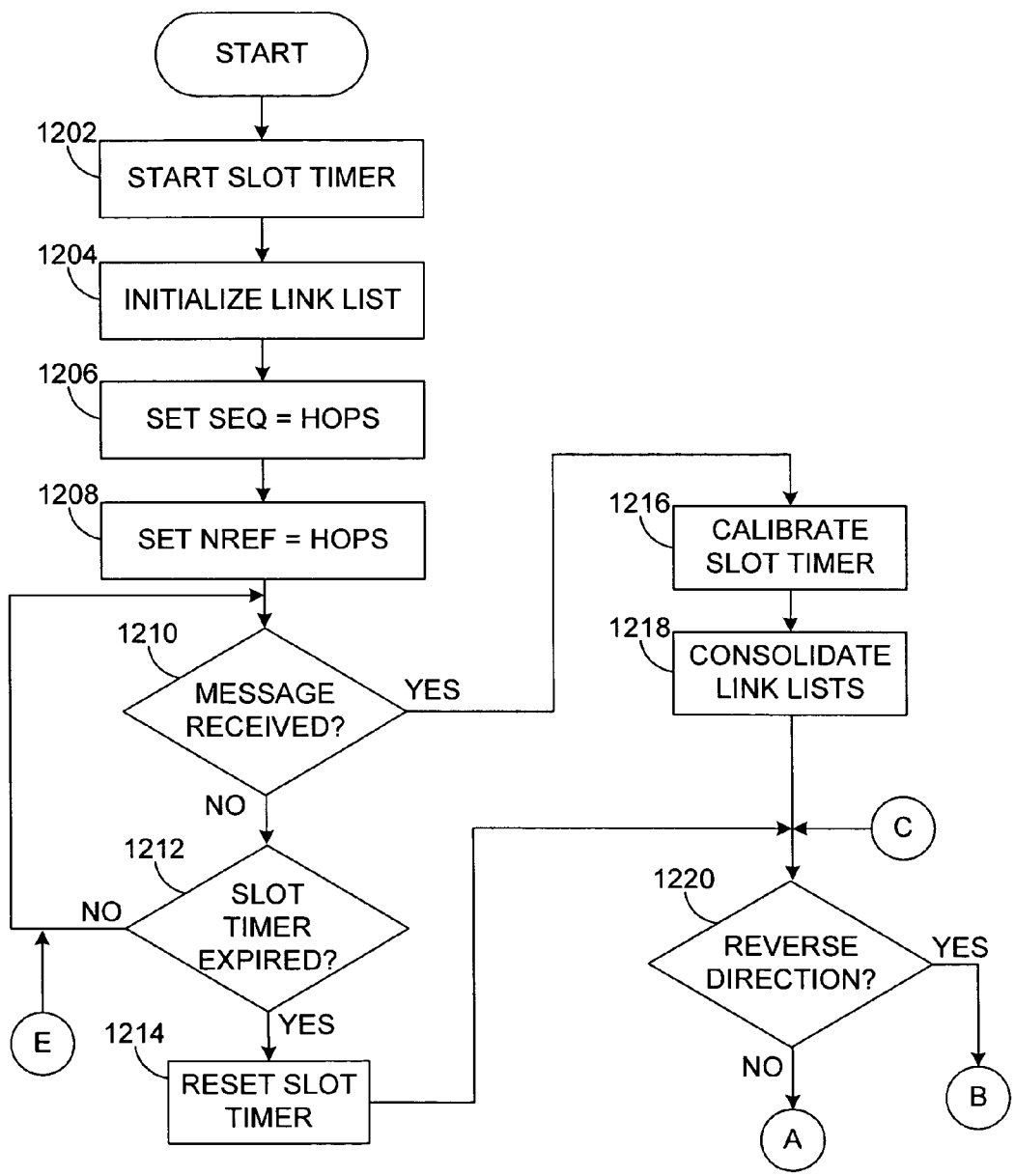
FIGS. 12A and 12B illustrate an example method for reporting collected routing information in a mesh network according to one embodiment of this disclosure.
Figure 12B:
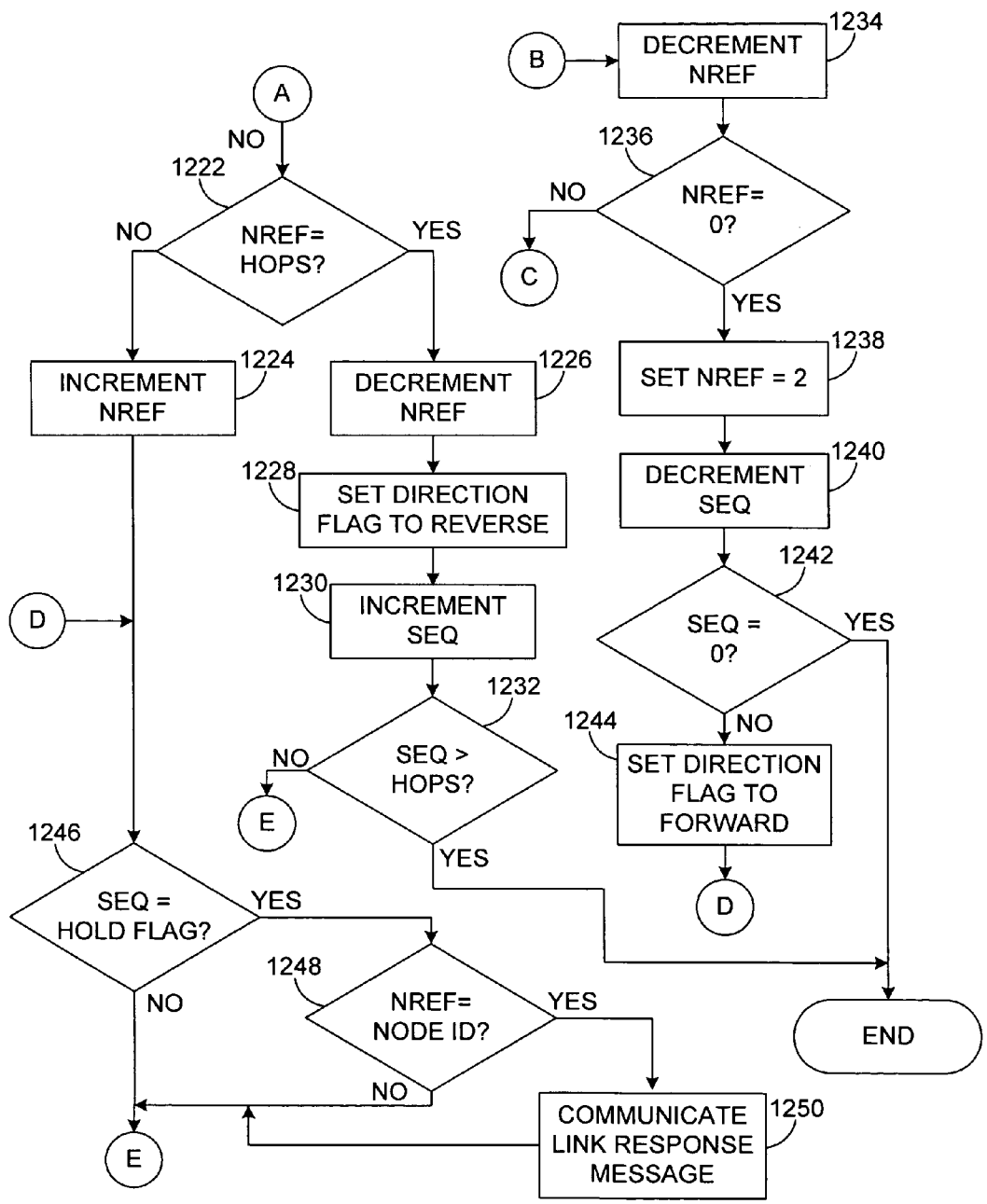

FIGS. 12A and 12B illustrate an example method 1200 for reporting collected routing information in a mesh network according to one embodiment of this disclosure. In particular, FIGS. 12A and 12B illustrate an example method 1200 for reporting collected routing information during the link reporting process. For ease of explanation, the method 1200 is described with respect to one of the routers 104a-104e operating in the mesh network 100 of FIG. 1. The method 1200 could be used by any other device and in any other system without departing from the scope of this disclosure.

The router starts a slot timer at step 1202. The method 1200 may be performed at the end of method 1100 in FIGS. 11A through 11C, and the slot timer may be set to a value that was used by the router at the end of method 1100.

The router initializes a link list at step 1204. This may include, for example, the router creating a new link list 308. This may also include the router inserting information from the router's link map 306 into the appropriate entry in the link list 308. The router initializes the sequence value at step 1206 and the network reference value at step 1208. This may include, for example, the router setting the sequence value 516 and the network reference value 518 to the hops value 514.

The router determines if a message is received at step 1210 and if the slot timer has expired at step 1212. If no message is received and the slot timer has not expired, the router returns to step 1210 to await a message. If the slot timer has expired, the router resets the slot timer at step 1214.

If a message is received at step 1210, the router calibrates its slot timer at step 1216. This may include, for example, the router adjusting the time slots 202 as shown in FIG. 2 so that the time slots 202 are synchronized with the new message.

The router consolidates link lists at step 1218. This may include, for example, the router extracting a link list 308 from the link response message 310 received during step 1210. This may also include the router combining the information in that link list 308 with the router's link list 308.

After step 1214 or 1218, the router performs steps 1220-1244. These steps maintain synchronization in the router during the link reporting process. Also, the router at step 1242 determines whether the sequence value equals zero. If so, the link reporting process has completed, and the method 1200 ends.

After steps 1220-1244, the router determines if the current sequence value equals the value stored in the hold flag at step 1246. If not, the router is not allowed to transmit a link response message 310 during the sequence, and the router returns to step 1210. If the current sequence value equals the value stored in the hold flag, the router determines if the current network reference value equals the router's unique identifier at step 1248. If not, the router is not allowed to transmit in the current time slot 202, and the router returns to step 1210. If the current network reference value equals the router's unique identifier, the router transmits a link response message at step 1250. This may include, for example, the router transmitting a link response message 310 containing the consolidated link list 308 produced at step 1218.

The method 1200 shown in FIGS. 12A and 12B has been described as being performed by the routers during the link reporting process. A similar method could be used by the central controller 102 during the link reporting process. For example, the central controller 102 could perform steps 1202-1244 of the method 1200 and skip steps 1246-1250. Using steps 1202-1244 would allow the central controller 102 to maintain synchronization during the link reporting process and to receive one or multiple link lists 308 from one or more routers (depending on the layout of the mesh network), where the link lists 308 contain collected routing information.

Although FIGS. 12A and 12B illustrate one example of a method 1200 for reporting collected routing information in a mesh network, various changes may be made to FIGS. 12A and 12B. For example, FIGS. 12A and 12B illustrate one technique for maintaining synchronization in the mesh network 100 using various values and flags. Other synchronization techniques could also be used in the mesh network 100.

Figure 13:
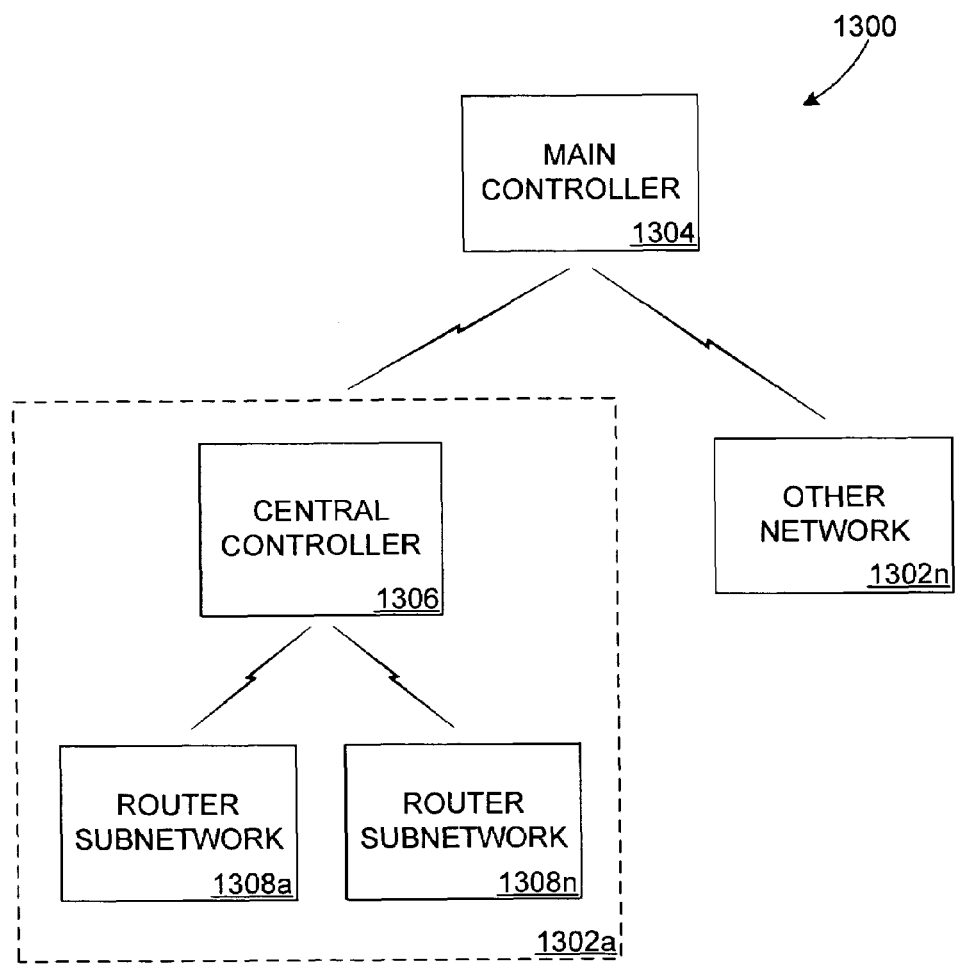
FIG. 13 illustrates an example multi-network mesh network configuration according to one embodiment of this disclosure.

FIG. 13 illustrates an example multi-network mesh network configuration 1300 according to one embodiment of this disclosure. The embodiment of the multi-network mesh network configuration 1300 shown in FIG. 13 is for illustration only. Other embodiments of the mesh network may be used without departing from the scope of this disclosure.

In this example, the multi-network mesh network configuration 1300 includes multiple mesh networks 1302a-1302n and a main controller 1304. One of the mesh networks 1302a in FIG. 13 includes a central controller 1306 and multiple router subnetworks 1308a-1308n.

Each of the router subnetworks 1308a-1308n includes one or more routers, such as the routers 104a-104e of FIG. 1. Communications between routers in the subnetworks 1308a-1308n may occur directly between the routers or indirectly through the central controller 1306. In some embodiments, the routers in each of the subnetworks 1308a-1308n may communicate using a unique radio frequency or frequencies, and there is no contention between the subnetworks 1308a-1308n. In other embodiments, the routers in the subnetworks 1308a-1308n communicate using the same radio frequency or frequencies, and the central controller 1306 synchronizes the routers to reduce or avoid collisions. In still other embodiments, the central controller 1306 may communicate with the routers using one frequency or set of frequencies, and the routers in each of the subnetworks 1308a-1308n communicate using a different frequency or set of frequencies.

As shown in FIG. 13, the main controller 1304 communicates with each of the mesh networks 1302a-1302n. The main controller 1304 may perform any of a wide variety of functions. For example, the main controller 1304 could log information collected by the mesh networks 1302a-1302n. The main controller 1304 could also control the operations of the mesh networks 1302a-1302n. As an example, the main controller 1304 could ensure that the mesh networks 1302a-1302n do not interfere with one another and reduce or eliminate collisions between the mesh networks 1302a-1302n.

As a specific example, the main controller 1304 could poll the various mesh networks 1302a-1302n and determine which mesh networks have the most traffic. The main controller 1304 could then allow the mesh networks with the most traffic to transmit data and place the remaining mesh networks into an idle state. As another specific example, the main controller 1304 could place each of the mesh networks into an idle state or an active state at specified intervals, allowing each of the mesh networks to transmit data only when active. As yet another specific example, the main controller 1304 could split a transmission time into sub-bands (such as 100 ms sub-bands) and assign a sub-band to each mesh network, where each mesh network may only transmit data during its sub-band.

The central controllers 1306 in the mesh networks 1302a-1302n may also cooperate to reduce contention between the mesh networks 1302a-1302n. For example, the central controllers 1306 could each detect when another central controller 1306 is operating on the same frequency. The central controllers 1306 may then operate as normal until one or more of them detect collisions. After that, the central controllers 1306 may synchronize their routers to help avoid collisions. The central controllers 1306 could also determine when their mesh networks 1302a-1302n are about to go idle and inform the other central controllers 1306, allowing the other central controllers 1306 to utilize the idle network's transmission times.

The multi-network mesh network configuration 1300 shown in FIG. 13 could implement any suitable functionality. For example, the multi-network mesh network configuration 1300 could represent a security/monitoring system where each of the mesh networks 1302a-1302n collects security information in a different building. Also, each of the router subnetworks 1308a-1308n could collect security information on a different floor of a building. The security information could represent any type of information, such as information identifying doors that open, rooms light that are activated, and air conditioner settings. Each central controller 1306 could timestamp and log information identifying these different events and make that information available of the main controller 1304.

Although FIG. 13 illustrates one example of a multi-network mesh network configuration 1300, various changes may be made to FIG. 13. For example, the mesh network configuration 1300 could include any number of mesh networks 1302a-1302n. Also, each mesh network could include any number of router subnetworks 1308a-1308n.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving a first message at least one of a plurality of routers in a mesh network;
   synchronizing the plurality of routers to a plurality of time slots using the first message;
   repeatedly incrementing a network reference value at each of multiple time slots up to a maximum value and then repeatedly decrementing the network reference value at each of multiple time slots down to a minimum value, wherein the maximum value corresponds to the number of routers; and
   broadcasting a second message at the router when the network reference value matches a specific value that is associated with a unique identifier of the router;
   wherein the network reference value is incremented up to the maximum value in alternate sequences of a plurality of sequences and is decremented down to the minimum value in remaining sequences of the plurality of sequences, and
   wherein broadcasting the second message comprises broadcasting subsequent second messages at each of the plurality of routers in each of at least some of the sequences when the network reference value matches the specific value of the router during the sequences.

2. The method of claim 1, wherein synchronizing the router to the plurality of time slots comprises:
   identifying a first time associated with the first message;
   adding the first time and a known second time to produce a total time, each time slot having a length equal to the total time; and
   setting a slot timer to the total time for a new time slot.

3. The method of claim 2, further comprising:
   resetting the slot timer to the total time at an end of each time slot.

4. The method of claim 2, further comprising:
   receiving a third message at the router; and
   calibrating the slot timer so as to be synchronized with the third message.

5. The method of claim 1, wherein the network reference value is incremented up to the maximum value in successive time slots and is decremented down to the minimum value in successive time slots.

6. The method of claim 1, wherein the first message is broadcast by one of: a central controller in the mesh network and another router in the mesh network.

7. The method of claim 1, wherein the router comprises a mobile router.

8. A computer program embodied on a computer readable medium and operable to be executed, the computer program comprising computer readable program code for:
   receiving a first message at least one of a plurality of routers in a mesh network;
   synchronizing the plurality of routers to a plurality of time slots using the first message;
   repeatedly incrementing a network reference value at each of multiple time slots up to a maximum value and then repeatedly decrementing the network reference value at each of multiple time slots down to a minimum value, wherein the maximum value corresponds to the number of routers; and
   broadcasting a second message at the router when the network reference value matches a specific value that is associated with a unique identifier of the router;
   wherein the network reference value is incremented up to the maximum value in alternate sequences of a plurality of sequences and is decremented down to the minimum value in remaining sequences of the plurality of sequences, and
   wherein broadcasting the second message comprises broadcasting subsequent second messages at each of the plurality of routers in each of at least some of the sequences when the network reference value matches the specific value of the router during the sequences.

9. The computer program of claim 8, wherein the computer readable program code for synchronizing the router to the plurality of time slots comprises computer readable program code for:
   identifying a first time associated with the first message;
   adding the first time and a known second time to produce a total time, each time slot having a length equal to the total time; and
   setting a slot timer to the total time for a new time slot.

10. The computer program of claim 9, further comprising computer readable program code for:
resetting the slot timer to the total time at an end of each time slot.

11. The computer program of claim 9, further comprising computer readable program code for:
receiving a third message at the router; and
calibrating the slot timer so as to be synchronized with the third message.

12. The computer program of claim 8, wherein the network reference value is incremented up to the maximum value in successive time slots and is decremented down to the minimum value in successive time slots.

13. The computer program of claim 8, wherein the first message is broadcast by one of: a central controller in the mesh network and another router in the mesh network.

14. The computer program of claim 8, wherein the router comprises a mobile router.

15. A mesh network, comprising:
a plurality of routers capable of communicating with a plurality of user endpoints; and
a central controller capable of defining a plurality of time slots and communicating with at least one of the routers in at least one of the time slots;
each router further capable of:
receiving a first message in one of the time slots;
synchronizing the plurality of routers to the plurality of time slots using the first message;
repeatedly incrementing a network reference value at each of multiple time slots up to a maximum value and then repeatedly decrementing the network reference value at each of multiple time slots down to a minimum value, wherein the maximum value corresponds to the number of routers; and
broadcasting a second message at the router when the network reference value matches a specific value that is associated with a unique identifier of the router;
wherein the network reference value is incremented up to the maximum value in alternate sequences of a plurality of sequences and is decremented down to the minimum value in remaining sequences of the plurality of sequences, and
wherein each router is capable of broadcasting subsequent second messages in each of at least some of the sequences when the network reference value matches the specific value of the router during the sequences.

16. The mesh network of claim 15, wherein each router is capable of synchronizing to the plurality of time slots by:
identifying a first time associated with the first message;
adding the first time and a known second time to produce a total time, each time slot having a length equal to the total time; and
setting a slot timer to the total time for a new time slot.

17. The mesh network of claim 16, wherein each router is further capable of:
resetting the slot timer to the total time at an end of each time slot.

18. The mesh network of claim 16, wherein each router is further capable of:
receiving a third message at the router; and
calibrating the slot timer so as to be synchronized with the third message.

19. The mesh network of claim 15, wherein the network reference value is incremented up to the maximum value in successive time slots and is decremented down to the minimum value in successive time slots.

20. The mesh network of claim 15, wherein at least some of the routers are mobile routers.

* * * * *